(12) United States Patent
Tran

(10) Patent No.: US 12,372,035 B2
(45) Date of Patent: Jul. 29, 2025

(54) VARIABLE DISPLACEMENT ENGINE

(71) Applicant: Jay Tran, Fountain Valley, CA (US)

(72) Inventor: Jay Tran, Fountain Valley, CA (US)

( * ) Notice: Subject to any disclaimer, the term of this patent is extended or adjusted under 35 U.S.C. 154(b) by 338 days.

(21) Appl. No.: 18/186,177

(22) Filed: Mar. 19, 2023

(65) Prior Publication Data

US 2024/0309820 A1   Sep. 19, 2024

(51) Int. Cl.
| | |
|---|---|
| *F02D 13/02* | (2006.01) |
| *F02B 21/02* | (2006.01) |
| *F02B 69/06* | (2006.01) |
| *F02D 15/02* | (2006.01) |

(52) U.S. Cl.
CPC .......... *F02D 13/0219* (2013.01); *F02B 21/02* (2013.01); *F02B 69/06* (2013.01); *F02D 13/0269* (2013.01); *F02D 15/02* (2013.01)

(58) Field of Classification Search
CPC .. F02D 13/0219; F02D 13/0269; F02D 15/02; F02B 21/02; F02B 69/06
See application file for complete search history.

(56) References Cited

U.S. PATENT DOCUMENTS

2007/0295290 A1 * 12/2007 Cao ................... F02D 13/0269
                                                                123/64
2015/0345410 A1 * 12/2015 Wirth ................. F02D 41/0007
                                                                123/559.2

FOREIGN PATENT DOCUMENTS

WO   WO-2017011927 A1 *  1/2017 ............. A01N 25/10

OTHER PUBLICATIONS

International search report, dated Jun. 28, 2024, application No. PCT/US/24/12683.

* cited by examiner

*Primary Examiner* — Jacob M Amick
(74) *Attorney, Agent, or Firm* — SHIMOKAJI IP

(57) ABSTRACT

A combustion engine comprises a main combustion cylinder configured to enable a piston to move therein; a main valve configured to move in the main combustion cylinder; an upper non-combustion chamber operatively adjacent to the main combustion cylinder; an upper intake valve configured to move in the upper non-combustion chamber and to communicate with an intake manifold; and an upper exhaust valve configured to move in the upper non-combustion chamber and to communicate with an exhaust manifold.

31 Claims, 24 Drawing Sheets

| Upper Chamber Valve Timing | | Displacement Mode | Cycle Mode (Otto or Atkinson) |
|---|---|---|---|
| Upper Exhaust Valve | Upper Intake Valve | | |
| Advanced | Advanced | Partial Engine Displacement | Atkinson Cycle Mode |
| Advanced | Neutral | Partial Engine Displacement | Otto Cycle Mode |
| Advanced | Retarded | Partial Engine Displacement | Atkinson Cycle Mode |
| Neutral | Advanced | Full Engine Displacement | Atkinson Cycle Mode |
| Neutral | Retarded | Partial Engine Displacement | Atkinson Cycle Mode |
| Neutral | Neutral | Full Engine Displacement | Otto Cycle Mode |
| Retard | Advanced | Partial Engine Displacement | Atkinson Cycle Mode |
| Retard | Neutral | Partial Engine Displacement | Otto Cycle Mode |
| Retard | Retard | Partial Engine Displacement | Atkinson Cycle Mode |

FIG. 9

Full Displacement - Previous Exhaust

Full Displacement - Late Stage Exhaust

Full Displacement - Power Stroke

Partial Displacement - Exhaust Advance, Intake Neutral

Partial Displacement - Previous Exhaust

Partial Displacement - Late Stage Exhaust

Partial Displacement - Next Intake

Partial Displacement - Next Compression

Partial Displacement - Power Stroke

Partial Displacement - Exhaust Retard, Intake Neutral

Blow Back - Late Stage Exhaust

Blow Back - Intake Stroke

Blow Back - Compression Stroke

Blow Back - Expansion Stroke

VARIABLE DISPLACEMENT ENGINE

BACKGROUND OF THE DISCLOSURE

The present invention generally relates to varying displacement of a combustion engine and, more particularly, to apparatus and methods of varying the timing of intake and/or exhaust gases to vary engine displacement.

Current combustion engines must meet government low emission and high fuel saving standards, provide sufficient power output for drivability, and ensure a high level of reliability. Most current gas combustion engines utilize an Otto cycle for high power density.

To meet government emission and fuel saving standards, car and truck manufacturers have adopted engines with a small displacement capacity. Small displacement has low power output which means that the vehicle is sluggish and slow on acceleration leading to decreased drivability. To circumvent the low power output, vehicle manufacturers use a turbocharger or a twin turbo, and a transmission that has gear ratio that produces a higher rpm for power.

However, engines that operate at a higher rpm wear down faster than engines with a low rpm. Small displacement engines have smaller bores and stroke sizes. Smaller bore and stroke sizes require engine parts—such as crankshaft, camshaft, bearing, piston, connecting rod, and engine block—to be smaller too. Smaller crankshafts, pistons, and connecting rods have a lower power tolerance capacity and overtime have lower longevity than engines with larger parts.

As can be seen, there is a need for improved apparatus and methods to vary engine displacement with varying engine loads.

SUMMARY OF THE DISCLOSURE

In one aspect of the present disclosure, a combustion engine, comprises a main combustion cylinder configured to enable a piston to move therein; a main valve configured to move in the main combustion cylinder; an upper non-combustion chamber operatively adjacent to the main combustion cylinder; an upper intake valve configured to move in the upper non-combustion chamber and to communicate with an intake manifold; and an upper exhaust valve configured to move in the upper non-combustion chamber and to communicate with an exhaust manifold.

In another aspect of the present disclosure, a combustion engine comprises a main combustion cylinder; a main valve in the main combustion cylinder; an upper non-combustion chamber in gas communication with the main combustion cylinder; an upper intake valve in the upper non-combustion chamber; and an upper exhaust valve in the upper non-combustion chamber; wherein the main valve, the upper intake valve, and the upper exhaust valve are configured to move independently of one another in a timed manner.

In a further aspect of the present disclosure, a combustion engine comprises a main combustion cylinder; a main valve in the main combustion cylinder; an upper non-combustion chamber configured to operate, with the main combustion cylinder, in an intake mode, in a compression mode, and in an exhaust mode; an upper intake valve in the upper non-combustion chamber; and an upper exhaust valve in the upper non-combustion chamber.

In yet another aspect of the present disclosure, a computer implemented method of varying a displacement of a combustion engine comprises controlling, by a controller, a timing of an upper intake valve in an upper non-combustion chamber of an engine block of the combustion engine; controlling, by the controller, a timing of an upper exhaust valve in the upper non-combustion chamber; controlling, by the controller, a timing of a main valve in a main combustion cylinder of the engine block; wherein the main valve timing, the upper intake valve timing, and the upper exhaust valve timing are controlled independently of one another.

In a still further aspect of the present disclosure, a non-transitory computer readable medium with executable instructions stored thereon, executed by a processor, to perform a method for varying a displacement of a combustion engine, wherein the method comprises changing at least one of: a timing of an upper intake valve in an upper non-combustion chamber of an engine block of the combustion engine; and a timing of an upper exhaust valve in the upper non-combustion chamber; fixing a timing of a main valve in a main combustion cylinder of the engine block; wherein the main combustion cylinder is in gas communication with the upper non-combustion chamber; wherein changing at least one of the timing of the upper intake valve and the timing of the upper exhaust valve occur independently of one another.

These and other features, aspects and advantages of the present disclosure will become better understood with reference to the following drawings, description, and claims.

BRIEF DESCRIPTION OF THE DRAWINGS

FIG. 9 is a table of exemplary methods of operating an engine according to the present disclosure.

DESCRIPTION OF THE DISCLOSURE

Figure 1:
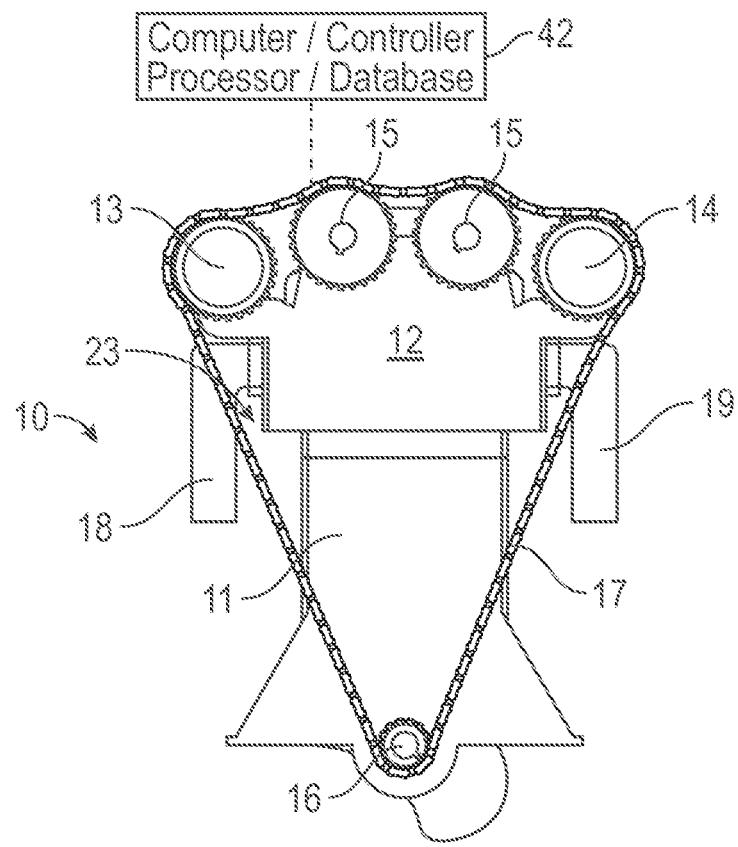
FIG. 1 is a front plan view of an exemplary embodiment of an engine according to the present disclosure.

The following detailed description is of the best currently contemplated modes of carrying out the disclosure. The description is not to be taken in a limiting sense, but it is made merely for the purpose of illustrating the general principles of the disclosure, since the scope of the disclosure is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The technical problems to be solved is that in a single engine with a fixed displacement, engine displacement does not change when engine load conditions change.

Broadly, the present disclosure solves the foregoing problems by the ability to manipulate the exhaust gases and intake air by using variable valve timing to scale the engine displacement on demand. The engine can be manufactured with a physically large engine displacement. It can operate as a high output, high power density engine or as a low output, low density engine. Low output with low density operation requires less fuel consumption. The flexibility of present engine allows it to be built larger with larger parts leading to greater longevity and reliability.

The present disclosure further solves the foregoing problems with an upper exhaust valve and an upper intake valve in an upper non-combustion chamber and outside of a main combustion cylinder; therefore, the timing of the two valves do not have an advancing or retarding restriction or limitation. In a conventional engine, the intake and exhaust valve are located within the combustion chamber where the upward and downward movement of the piston takes place. The movement of the piston creates restriction and limitation for the valve opening/closing event when valves share the same combustion chamber with the piston. In the present disclosure, without the limitation of the piston movement, the upper intake valve and the upper exhaust valve can be designed with larger valve profiles, larger valve lift, and larger timing range. And the main valve can have a large flow capacity suitable for a performance racing engine.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
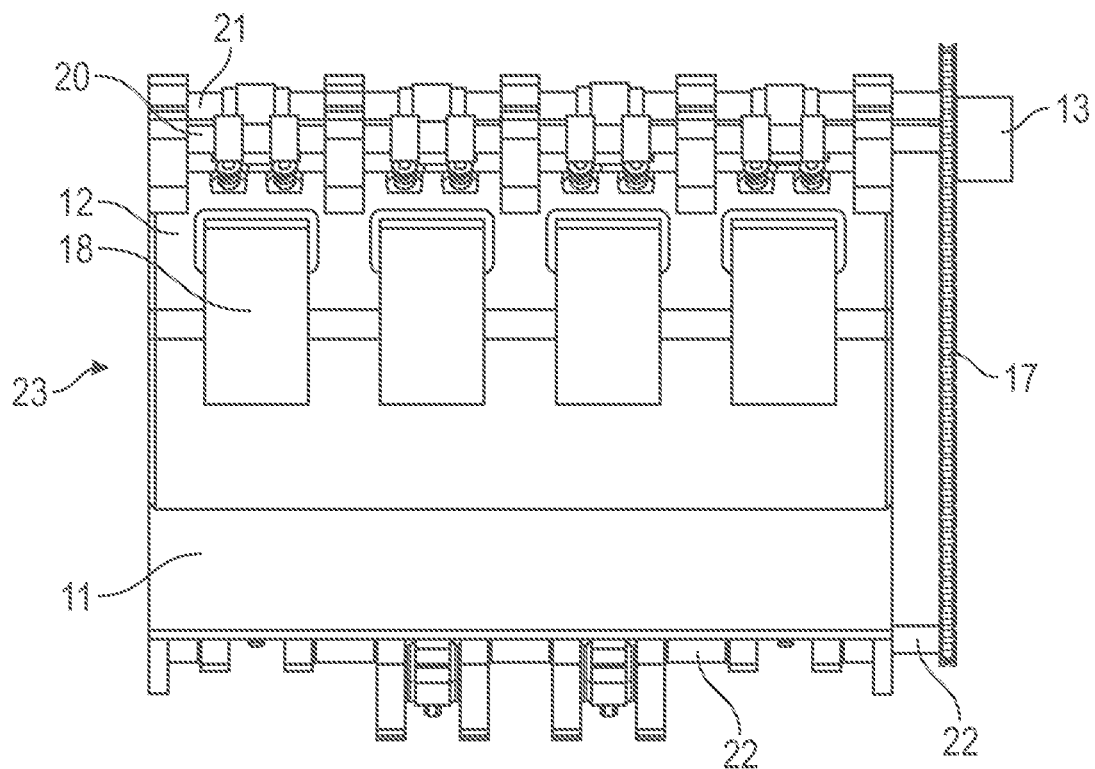
FIG. 3 is a side view of an exemplary embodiment of an engine according to the present disclosure.

FIGS. 1 and 3, according to an embodiment, are a front view and a side view, respectively, of an exemplary combustion engine 10. The engine 10 may have an engine block 23. The engine block 23 may include a cylinder block 11 and a cylinder head 12, in an embodiment. The engine 10 may include one or more upper intake valve phasers (i.e., upper intake cam phasers) 13 located at a top area of the cylinder head 12, in an embodiment. The engine 10 may include one or more upper exhaust valve phasers (i.e., upper exhaust cam phasers) 14 located at the top area of the cylinder head 12, in an embodiment. In an embodiment, the engine 10 includes one upper intake valve phaser 13 and one upper exhaust valve phaser 14. According to an embodiment, the engine 10 may include one or more main valve sprockets 15 located at the top area of the cylinder head 12 and between the upper intake valve phaser(s) 13 and the upper exhaust valve phaser(s) 14. In an embodiment, the engine 10 includes two main valve sprockets 15.

In an embodiment, the engine 10 may include a crankshaft sprocket 16 located at a bottom area of the cylinder block 11. A timing chain 17 may be engaged to the crankshaft sprocket 16, a sprocket on the upper intake valve phaser(s) 13, a sprocket on the upper exhaust valve phaser(s) 14, and the main valve sprockets 15. In an embodiment, the engine 10 may include an intake manifold 18, at one side of the engine block 23, and an exhaust manifold 19 at an opposite side of the engine block 23.

The engine 10 may further include a computer or controller 42, in an embodiment. The controller 42 may include a processor and a database. In an embodiment, the database may include table(s) of settings that correlate engine load to engine operation mode. In an embodiment, the settings may include advanced, retarded, and neutral timing settings for the upper intake valve phaser(s) 13 and/or the upper exhaust valve phaser(s) 14 according to engine operation mode.

Figure 2:
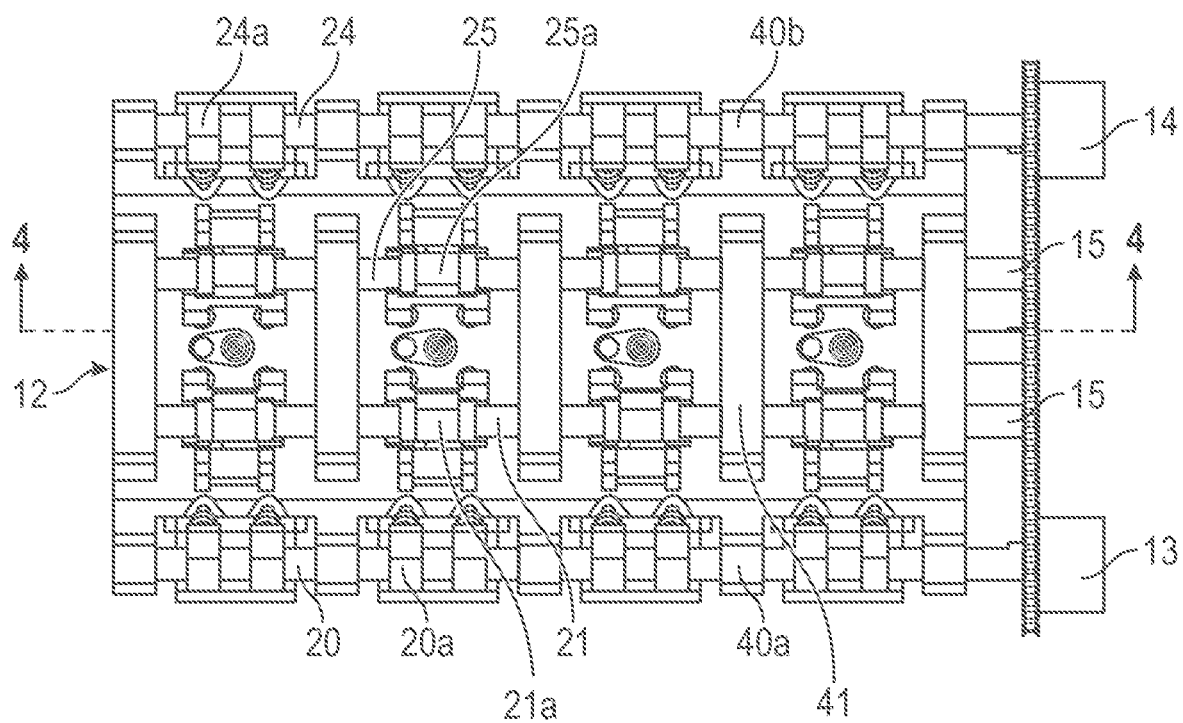
FIG. 2 is a top view of an exemplary embodiment of an engine according to the present disclosure.

FIG. 2 is a top view of the engine 10 according to an embodiment. The engine 10 may include one or more upper intake camshafts 20 that may be configured to move one or more upper intake valves 32 described below, according to an embodiment. The one or more upper intake camshafts 20 may be configured to move the one or more upper intake valves 32 in one or more upper non-combustion chambers 30 described below, according to an embodiment.

The one or more upper intake camshafts 20 may be configured engaged to one or more upper intake cams 20a, in an embodiment. The upper intake camshaft(s) 20 may be engaged to the upper intake valve phaser(s) 13, in an embodiment. One or more intake camshaft bearing caps 40a may support the upper intake camshaft(s) 20 on the engine block 23.

Similarly, the engine 10 may include one or more upper exhaust camshafts 24 that may be configured to move one or more upper exhaust valves 33 described below, according to an embodiment. The one or more upper exhaust camshafts 24 may be configured to move the one or more upper exhaust valves 33 in one or more upper non-combustion chambers 30 described below, according to an embodiment.

The one or more upper exhaust camshafts 24 can be configured to engage to one or more upper exhaust cams 24a, in an embodiment. The upper exhaust camshaft(s) 24 may be engaged to the upper exhaust valve phaser(s) 14, in an embodiment. One or more exhaust camshaft bearing caps 40b may support the upper exhaust camshaft(s) 24 on the engine block 23.

The engine 10 may include one or more main camshafts 21, 25 that may be configured to move one or more main valves 31 described below, in an embodiment. The one or more main camshafts 21, 25 may be configured to move the one or more main valves 31 in one or more main combustion cylinders 29 described below, in an embodiment.

The one or more main camshafts 21, 25 may be engaged to one or more main cams 21a, 25a, in an embodiment. The main camshaft(s) 21, 25 may be engaged to the main valve sprockets 15, in an embodiment. One or more main camshaft bearing caps 41 may support the main camshaft(s) 25 on the engine block 23. The engine 10 may include a crankshaft 22 located at a bottom area of the cylinder block 11 and which can be operatively connected to one or more pistons 34 described below (FIG. 3).

Figure 4:
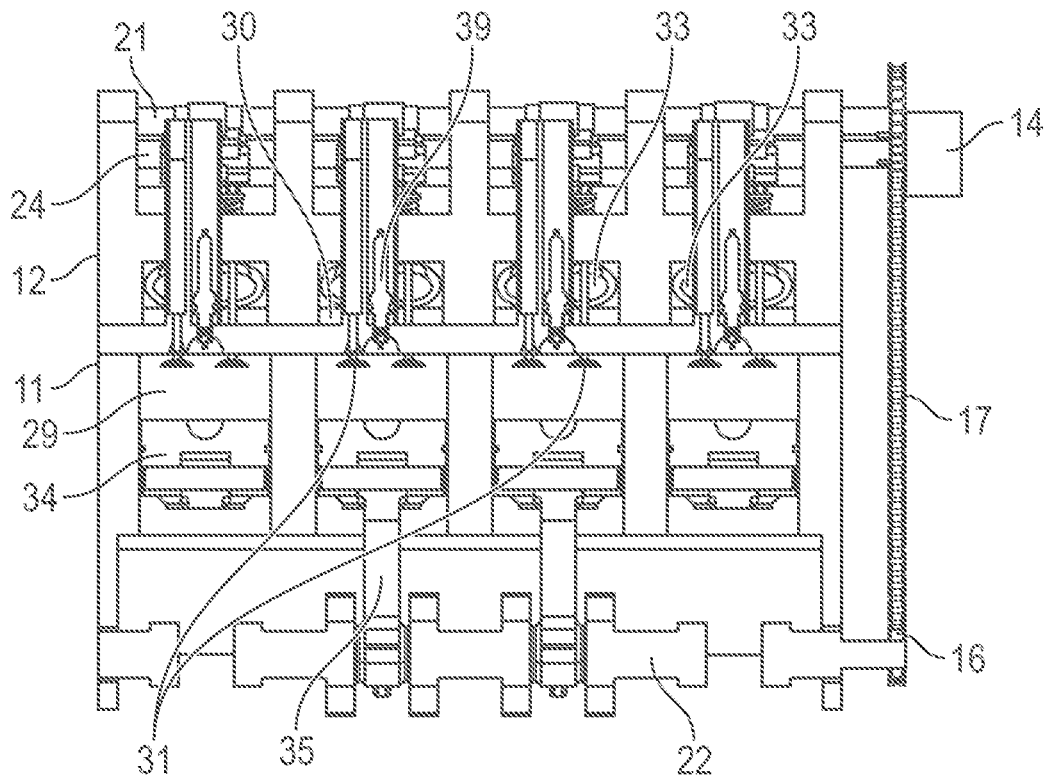
FIG. 4 is a cross-sectional view of an exemplary embodiment of an engine according to the present disclosure taken along line 4-4 of FIG. 2.

FIG. 4 is a cross-sectional view of the engine 10 taken along lines 4-4 of FIG. 2. In an embodiment, the cylinder block 11 may include one or more main combustion cylinders 29 with a respective piston 34 therein. The main combustion cylinders 29 may be configured to enable the pistons 34 to move therein, in an embodiment. One or more of the main combustion cylinders 29 may be configured to enable combustion of intake air therein and to enable expelling therefrom exhaust gas, in an embodiment. One or more connecting rods 35 may operatively connect the pistons 34 to the crankshaft 22, in an embodiment.

In an embodiment, the cylinder head 12 may include one or more upper non-combustion chambers 30. One or more of the upper non-combustion chambers 30 may be operatively adjacent to a respective main combustion cylinder 29, in an embodiment. One or more of the upper non-combustion chambers 30 may be in gas communication with a respective main combustion cylinder 29, in an embodiment. One or more of the upper non-combustion chambers 30 may be configured to operate, with one or more of the main combustion cylinders 29, in an intake mode, in a compression mode, and in an exhaust mode, in an embodiment. However, in an embodiment, combustion is not intended to occur in the one or more upper non-combustion chamber 30. According to an embodiment, one or more of the upper non-combustion chambers 30 may be configured to receive intake air from outside of the engine 10 and to expel exhaust gas from one or more of the main combustion cylinders 29, in an embodiment. In an embodiment, one or more of the upper non-combustion chambers 30 may be configured to receive exhaust gas from one or more of the main combustion cylinders 29.

According to an embodiment, one or more of the upper non-combustion chambers 30 can be in gas communication with the intake manifold 18. According to an embodiment, one or more of the upper non-combustion chambers 30 can be in gas communication with the exhaust manifold 19. In an embodiment, each upper non-combustion chamber 30 is in gas communication with the intake manifold 18 and with the exhaust manifold 19.

In FIG. 4, according to an embodiment, one or more of the main valves 31 may be configured to move in one or more of the main combustion cylinders 29. In an embodiment, one or more of the main valves 31 may be configured to enable intake air into one or more of the main combustion cylinders 29 and to expel exhaust gas out of one or more of the main combustion cylinders 29. In other words, the main valve(s) 31 can operate as both an intake valve and an exhaust valve.

In an embodiment, one or more upper exhaust valves 33 may be configured to move in the upper non-combustion chamber 30. In an embodiment, one or more of the upper exhaust valves 33 may be configured to expel exhaust gas from one or more main combustion cylinders 29 to the exhaust manifold 19.

In an embodiment, one or more spark plugs 39 may be operatively associated with one or more main combustion cylinders 29. In an embodiment, a respective spark plug 39 is associated with each main combustion cylinder 29.

Figure 5:
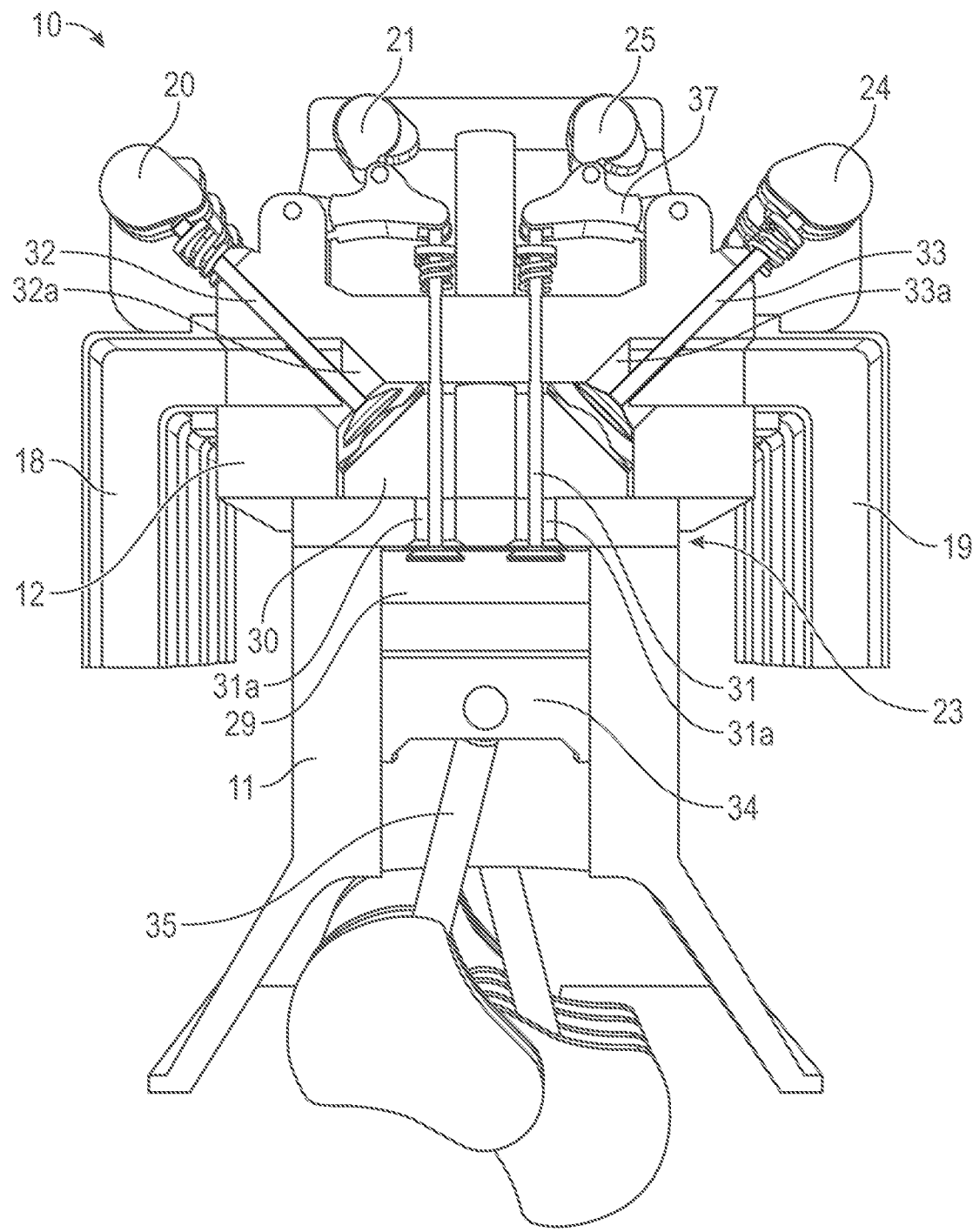
FIG. 5. is a front cross-sectional view of an exemplary embodiment of an engine according to the present disclosure.
Figure 6:
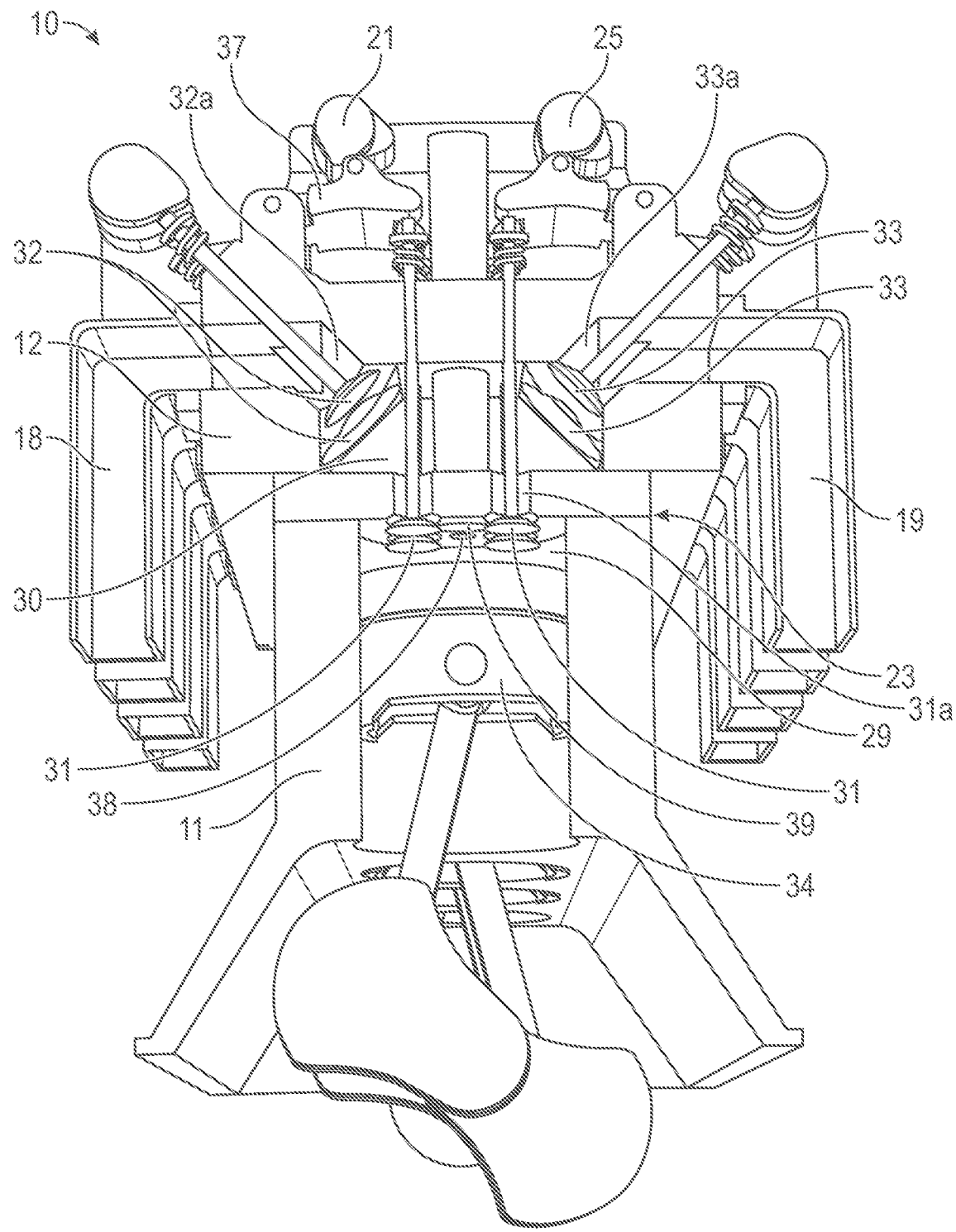
FIG. 6. is a front cross-sectional perspective view of an exemplary embodiment of an engine according to the present disclosure.
Figure 7:
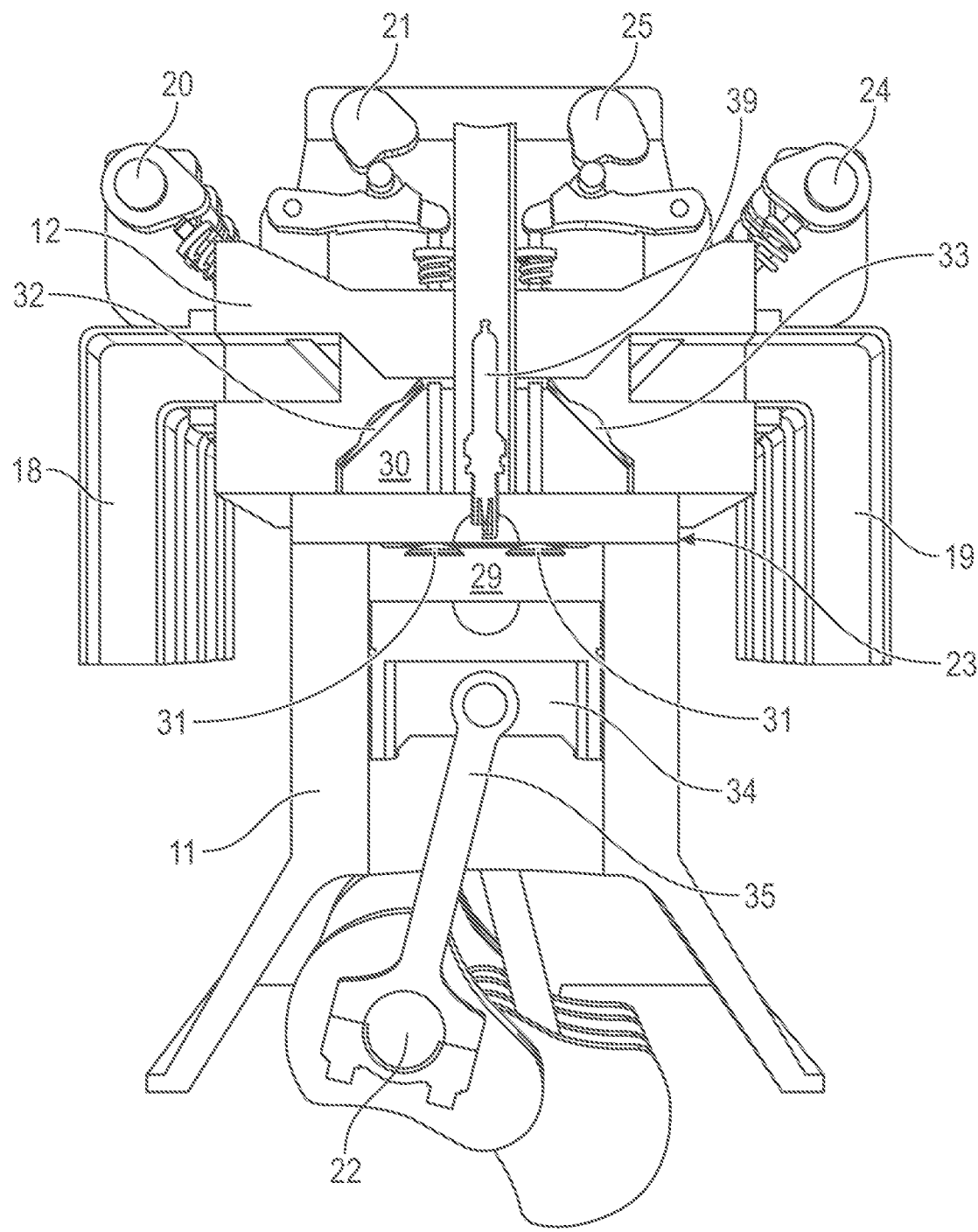
FIG. 7. is another front cross-sectional view of an exemplary embodiment of an engine according to the present disclosure.

FIG. 5 is a plan, cross-sectional view of the engine block 23, according to an embodiment. FIG. 6 is a perspective, cross-sectional view of the engine block 23 shown in FIG. 5. FIG. 7. is another plan, cross-sectional view of the engine block 23.

In FIG. 5, in an embodiment, the main camshafts 21, 25 can be operatively connected, via one or more main valve rockers 37, to one or a plurality of main valves 31. In an embodiment, there can be four main valves 31 configured to move in one main combustion cylinder 29 (FIG. 6). According to an embodiment, one or a plurality of main valves 31 can be configured to operate in one or a plurality of main combustion cylinders 29 as a main intake valve(s) and a main exhaust valve(s). At any given time, all main valves 31 are either operating as main intake valves or as main exhaust valves, in an embodiment.

One or more main channels 31a may enable one or more main valves 31 to move therein between main valve 31 opening and closing positions, in an embodiment. The one or more main channels 31a may extend between one or more main combustion cylinders 29 and one or more upper non-combustion chambers 30 and provide gas communication therebetween.

In an embodiment, the upper intake camshaft 20 can be operatively connected to one or a plurality of upper intake valves 32. In an embodiment, one or a plurality of upper intake valves 32 can be configured to move in one or a plurality of upper non-combustion chambers 30. In an embodiment, there can be two upper intake valves 32 configured to move in one upper non-combustion chamber 30 (FIG. 6). One or a plurality of upper intake valves 32 can be configured to be operatively adjacent to and/or in gas communication with the intake manifold 18, according to an embodiment.

In an embodiment, one or more of the upper intake valves 32 may be configured to pass intake air from the intake manifold 18 into one or more of the upper non-combustion chambers 30. In an embodiment, one or more of the upper intake valves 32 may be configured to pass exhaust gas from the one or more main combustion cylinders 29 into the intake manifold 18.

One or more upper channels 32a may enable one or more upper intake valves 32 to move therein between upper intake valve 32 opening and closing positions, in an embodiment. The one or more upper channels 32a may extend between one or more upper non-combustion chambers 30 and the intake manifold 18 and provide gas communication therebetween.

In an embodiment, the upper exhaust camshaft 24 can be operatively connected to one or a plurality of upper exhaust valves 33. In an embodiment, one or a plurality of upper exhaust valves 33 can be configured to move in one or a plurality of upper non-combustion chambers 30. In an embodiment, there can be two upper exhaust valves 33 configured to move in one upper non-combustion chamber 30 (FIG. 6). One or a plurality of upper exhaust valves 33 can be configured to be operatively adjacent to and/or in gas communication with the exhaust manifold 19, according to an embodiment.

One or more upper channels 33a may enable one or more upper exhaust valves 33 to move therein between upper exhaust valve 33 opening and closing positions, in an embodiment. The one or more upper channels 33a may extend between one or more upper non-combustion chambers 30 and the exhaust manifold 19 and provide gas communication therebetween.

In an embodiment, as indicated above, the upper exhaust camshaft 24 can move via the upper exhaust valve phaser 14 and the upper intake camshaft 20 can move via the upper intake valve phaser 13. Accordingly, the upper exhaust camshaft 24 can be configured to move independently of the upper intake camshaft 20 in a timed manner. In turn, the upper exhaust valve(s) 33 can be configured to move independently of the upper intake valve(s) 32 in a timed manner. Since the main camshafts 21, 25 are not connected to the upper exhaust valve phaser 14 or the upper intake valve phaser 13, the main valve(s) 31 can be configured to move independently of the upper exhaust valve(s) 33 and of the upper intake valve(s) 32 in a timed manner. In other words, the upper intake valve timing, the upper exhaust valve timing, and the main valve timing can operate independently of one another.

In an embodiment, the upper intake valve(s) 32 and the upper exhaust valve(s) 33 can be located near a top area of the upper non-combustion chamber(s) 30 and outside of the main combustion cylinder(s) 29. Consequently, a size of the valve(s) 32, 33 and their valve duration (i.e., opening and closing duration) can be designed independently of piston location, stroke, and movement.

In FIGS. 6 and 7, in an embodiment, one or more spark plugs 39 may be operatively in one or more main combustion cylinders 29. In an embodiment, one of more of the spark plugs 39 may extend through one or more of the upper non-combustion chambers 30 and into one or more of the main combustion cylinders 29.

In an embodiment, one or more fuel injectors 38 may be operatively adjacent to one or more of the spark plugs 39. In an embodiment, one or more of the fuel injectors 38 may extend into one or more of the main combustion cylinders 29. In an embodiment, one fuel injector 38 and one spark plug 39 extend into one main combustion cylinder 29.

Figure 8A:
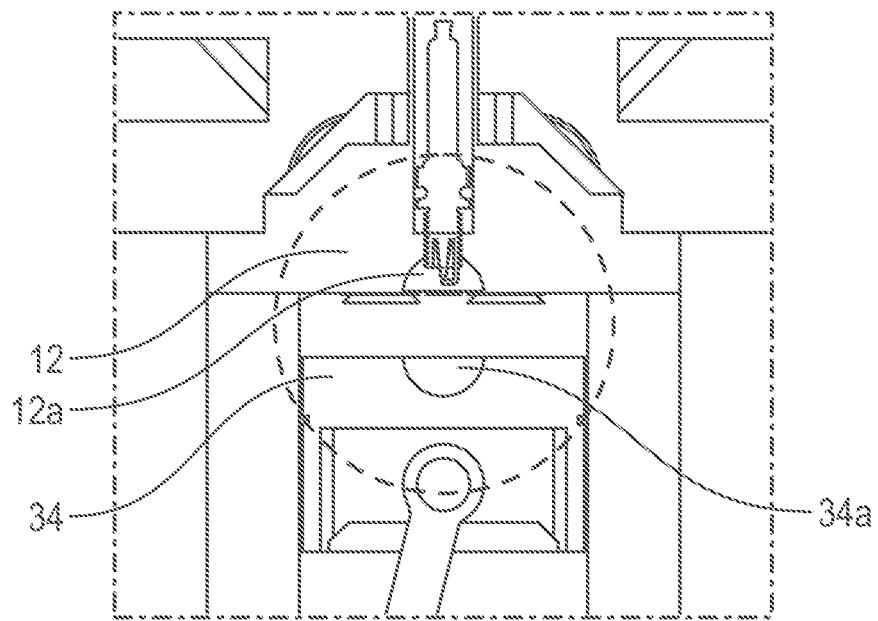
FIG. 8A is an enlarged partial cross-sectional view of an exemplary embodiment of an engine according to the present disclosure.
Figure 8B:
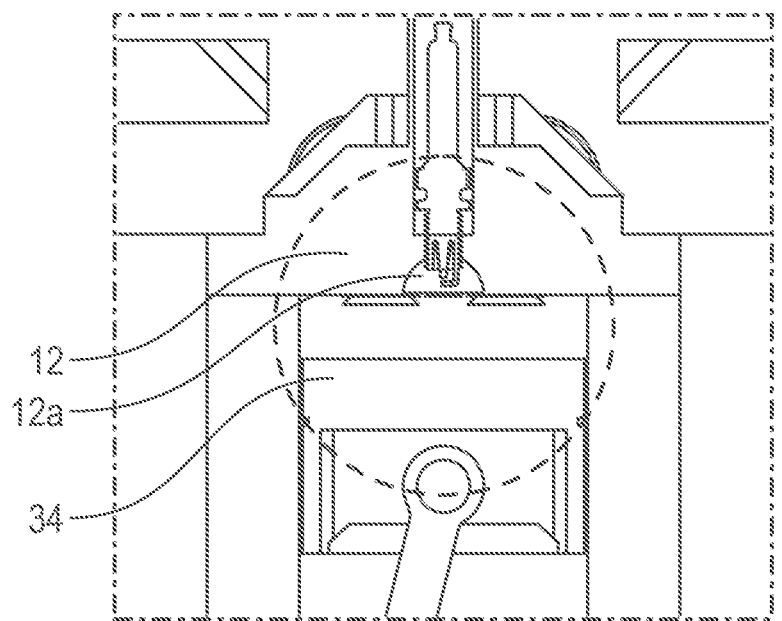
FIG. 8B is another enlarged partial cross-sectional view of an exemplary embodiment of an engine according to the present disclosure.

FIGS. 8A and 8B are enlarged views depicting an interface between the spark plug 39 and the main combustion cylinder 29, according to two embodiments.

In FIG. 8A, a recess 12a can be in a bottom area of the cylinder head 12, according to an embodiment. The recess 12a can be configured to receive therein an electrode end of the spark plug 39, in an embodiment. The recess 12a can be spherical in shape, according to an embodiment. A recess 34a can be in a head area of the piston 34, in an embodiment. The recess 34a can be opposite to the recess 12a whereby the recesses open towards one another, in an embodiment. The recess 34a may have the same shape as the recess 12a, in an embodiment. The recess 34a can be spherical in shape, in an embodiment.

In FIG. 8B, the recess 12a in the cylinder head 12 can be the same as in FIG. 8A. However, in this embodiment, there is no recess 34a in the piston 34.

In the embodiments of FIGS. 8A and 8B, the recesses 12a and/or 34a (including a spherical combustion chamber) may allow for faster fuel burn time and more even burn from the center outward. A more complete combustion may also be achieved, thereby increasing efficiency. Further, stroke ignition may happen at the center of the piston head for direct power transfer to the piston head.

FIG. 9 is a chart depicting exemplary modes of operation of the combustion engine 10. In an embodiment, the engine 10 can operate between a full engine displacement mode and a partial engine displacement mode. In the full engine displacement mode, the engine 10 can be operating at a maximum displacement capacity of the engine 10, according to an embodiment. In the partial engine displacement mode, the engine 10 can be operating at less than the maximum displacement capacity of the engine 10, according to an embodiment.

Full engine and partial engine displacement modes can be achieved by the main valve(s) 31, upper intake valve(s) 32, and upper exhaust valve(s) 33 being configured to operate in those two modes, according to an embodiment. Depending on whether the mode is full engine displacement or partial engine displacement, a timing of the upper intake valve(s) 32 and the upper exhaust valve(s) 33 can be separately adjusted/controlled to advanced, retarded, or neutral (FIG. 9), according to an embodiment. The timing of the main valve(s) 31 can be adjusted/controlled to maintain a fixed timing, according to an embodiment.

In FIG. 9, in an embodiment, the engine 10 can operate between an Atkinson cycle mode and an Otto cycle mode. In the Atkinson cycle mode, the engine 10 can be operating with a piston compression stroke that is less than a piston expansion stroke, according to an embodiment. In the Otto cycle mode, the engine 10 can be operating with a piston compression stroke equal to a piston expansion stroke, according to an embodiment.

Atkinson cycle mode and Otto cycle mode can be achieved by the main valve(s) 31, upper intake valve(s) 32, and upper exhaust valve(s) 33 being configured to operate in those two modes, according to an embodiment. Depending on whether the mode is Atkinson cycle mode or Otto cycle mode, a timing of the upper intake valve(s) 32 and the upper exhaust valve(s) 33 can be separately adjusted/controlled to advanced, retarded, or neutral (FIG. 9), according to an embodiment. At the same time, a timing of the main valve(s) 31 can be adjusted/controlled to maintain a fixed timing, according to an embodiment.

In other embodiments, the engine 10 may operate in full engine displacement mode with Otto cycle mode, partial engine displacement mode with Otto cycle mode, full engine displacement mode with Atkinson cycle mode, and partial engine displacement with Atkinson cycle mode.

In an embodiment, the engine 10 can operate in a blow back mode. In such mode, the engine 10 can be operating with exhaust gas from the main combustion cylinder(s) 29 being expelled into the upper non-combustion chamber(s) 30 and then to the intake manifold 18. The upper intake valve(s) 32 may be configured to transfer exhaust gas to the intake manifold 18, in an embodiment. A timing of the upper intake valve(s) 32 and the upper exhaust valve(s) 33 can be separately adjusted/controlled to advanced, retarded, or neutral to achieve the blow back mode, according to an embodiment. The timing of the main valve(s) 31 can be adjusted/controlled to maintain a fixed timing, according to an embodiment.

Figure 10:
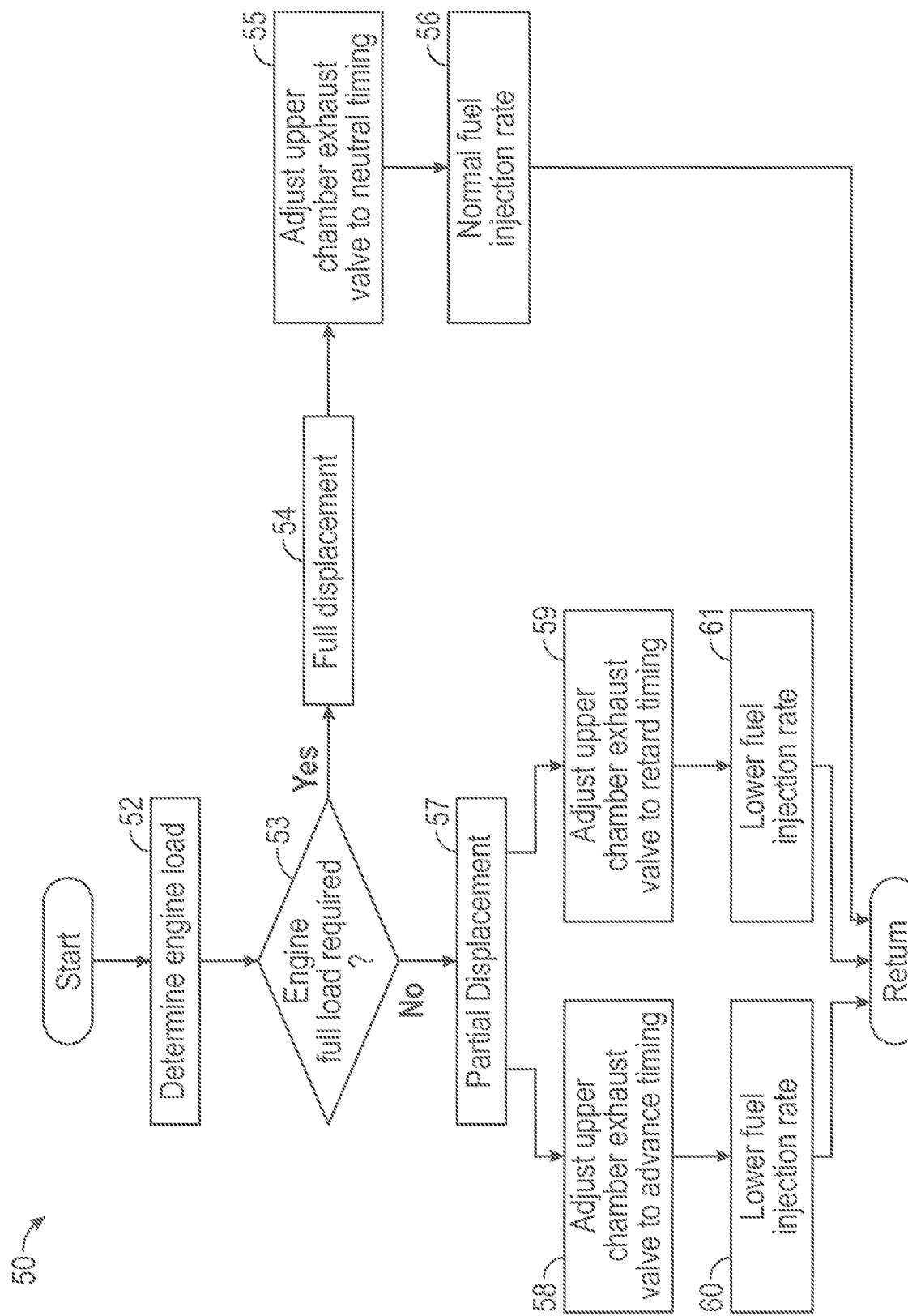
FIG. 10 is a flow chart of operating an engine in an exemplary full displacement mode and an exemplary partial displacement mode according to the present disclosure.
Figure 18:
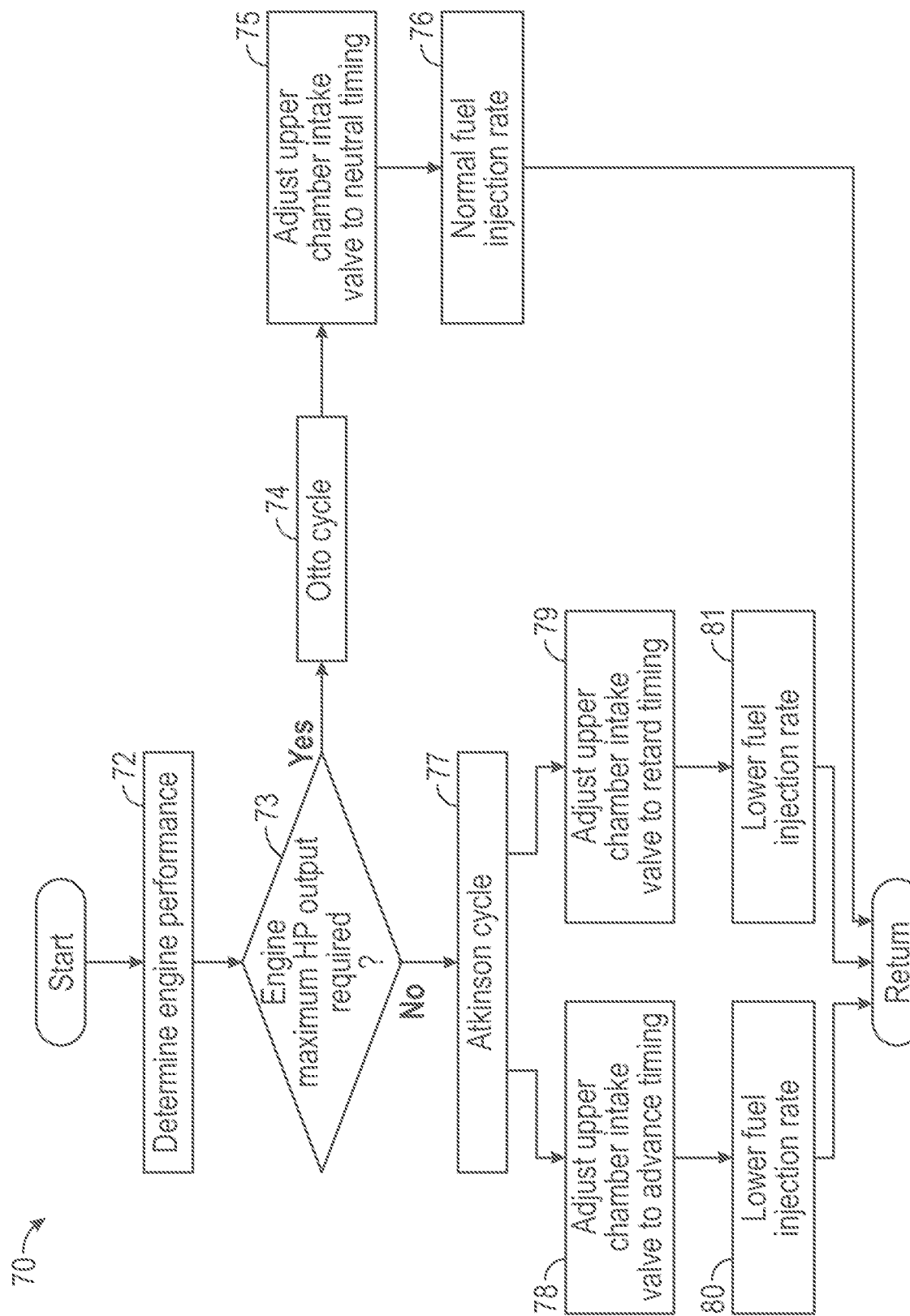
FIG. 18 a flow chart of operating an engine in an exemplary Otto cycle mode and an exemplary Atkinson cycle mode according to the present disclosure.

Referring to FIGS. 1, 10, and 18, the present disclosure provides a computer implemented method of varying a displacement of the combustion engine 10. The controller 42 can be used to implement one or more of the operating modes described above. Thus, it can be appreciated that the controller 42 can be configured to control the timing of the upper intake valve(s) 32 in the upper non-combustion chamber(s) 30, the timing of the main valve(s) 31 in the main combustion cylinder(s) 29, and the timing of the upper exhaust valve(s) 33 in the upper non-combustion chamber(s) 30, according to an embodiment. The controller 42 may also be configured to perform the foregoing timing control independently of or separately from one another.

In an embodiment, the controller 42 may be configured to control the timing of the upper intake valve(s) 32 and the upper exhaust valve(s) 33 that can include advanced, retarded, or neutral timing. At the same time, the controller 42 may be configured to control the timing of the main valve(s) 31 that can include maintaining a fixed timing of the main valve(s) 31, in an embodiment. By the timing of the upper intake valve(s) 32 and the main valve(s) 31, intake air can be enabled to enter the upper non-combustion chamber(s) 30 and pass into the main combustion cylinder(s) 29. Similarly, by the timing of the upper exhaust valve(s) 33 and the main valve(s) 31, exhaust gas can be enabled to pass from the main combustion cylinder(s) 29, into the upper non-combustion chamber(s) 30, and exit from the upper non-combustion chamber(s) 30.

Referring to FIGS. 1, 10, and 18, the present disclosure provides a non-transitory computer readable medium with executable instructions stored thereon, executed by a processor, to perform a method for varying a displacement of the combustion engine 10. In an embodiment, the method may include changing at least one of a timing of the upper intake valve(s) 32 in the upper non-combustion chamber(s) 30 and a timing of the upper exhaust valve(s) 33 in the upper non-combustion chamber(s) 30. In an embodiment, the method may include fixing a timing of the main valve(s) 31 in the main combustion cylinder(s) 29. In an embodiment, the method may include enabling the main combustion cylinder(s) 29 to be in gas communication with the upper non-combustion chamber(s) 30. In an embodiment, the method may include changing the timing of the upper intake valve(s) 32 and the timing of the upper exhaust valve(s) 33 independently of one another.

It can be appreciated that, in the foregoing method and computer readable medium, the combustion engine 10 can operate in the full engine displacement mode, the partial engine displacement mode, the Atkinson cycle mode, the Otto cycle mode, and the blow back mode.

Examples

FIG. 10 is a method 50 of varying engine mode to either full engine displacement or partial engine displacement, according to an embodiment. The method 50 may start at a step 52 by determining an engine load, such as by an accelerator pedal position sensor, mass air flow (MAF) sensor, engine revolutions per minute (RPM) sensor, wheel speed sensor, and manifold absolute pressure (MAP) sensor on the intake manifold 18. At a step 53, it can be determined, such as by the controller 42, whether an engine full load is required.

If "yes" at step 53, then at a step 54, it can be determined, such as by the controller 42, that a full engine displacement mode is to be implemented. At a step 55, the upper exhaust valve(s) 33 may be adjusted, such as by the controller 42 controlling the upper exhaust valve phaser(s) 14, to a neutral timing. At a step 56, a fuel injection rate may be adjusted, such as by the controller 42 controlling the fuel injector(s) 38, to a normal rate.

If "no" at step 53, then at a step 57, it can be determined, such as by the controller 42, that a partial engine displacement mode is to be implemented. At a step 58, the upper exhaust valve(s) 33 may be adjusted, such as by the controller 42 controlling the upper exhaust valve phaser(s) 14, to an advanced timing. At a step 60, a fuel injection rate may be adjusted, such as by the controller 42 controlling the fuel injector(s) 38, to a lower rate. Following the step 57, at a step 59, the upper exhaust valve(s) 33 may be adjusted, such as by the controller 42 controlling the upper exhaust valve phaser(s) 14, to a retarded timing. At a step 61, a fuel injection rate may be adjusted, such as by the controller 42 controlling the fuel injector(s) 38, to a lower rate.

Figure 11A:
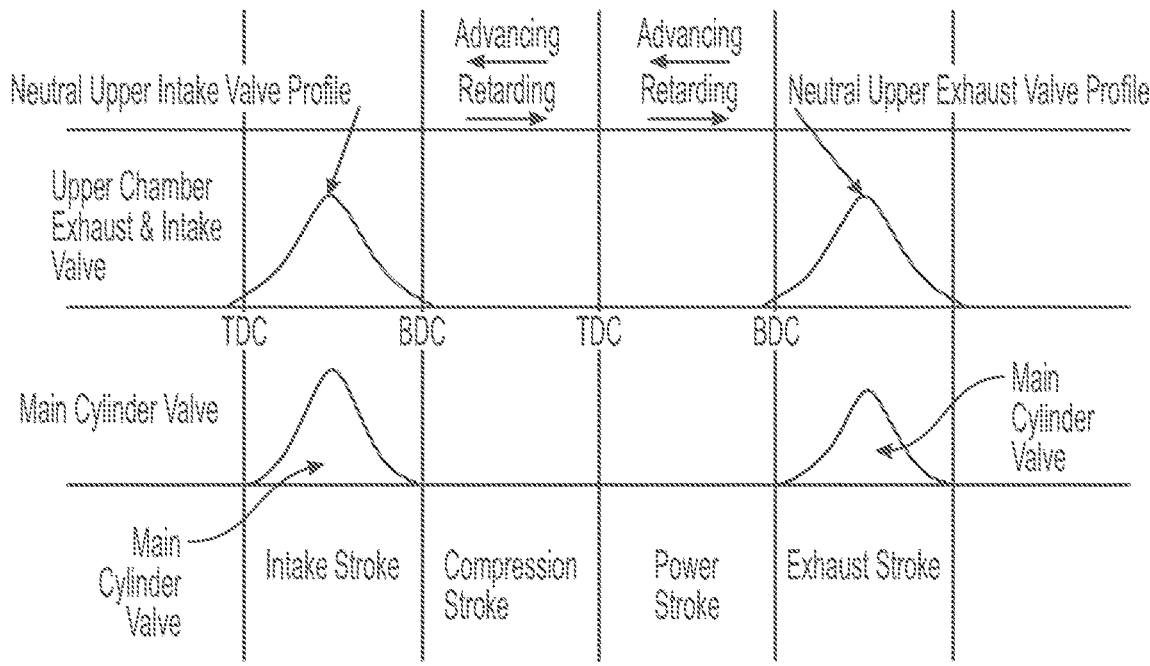
FIG. 11A is a valve profile of operating an engine in an exemplary full flow mode according to the present disclosure.

FIG. 11A is a valve profile of the combustion engine 10 operating with maximum gas flow for intake and exhaust. "TDC" and "BDC" refer respectively to the top dead center position and to the bottom dead center position of the piston(s) 34. The upper intake valve(s) 32 and the upper exhaust valve(s) 33 can both be at a neutral timing, and can both be in phase (i.e., overlap) with the main valve(s) 31 timing to allow for maximum gas flow.

Figure 11B:
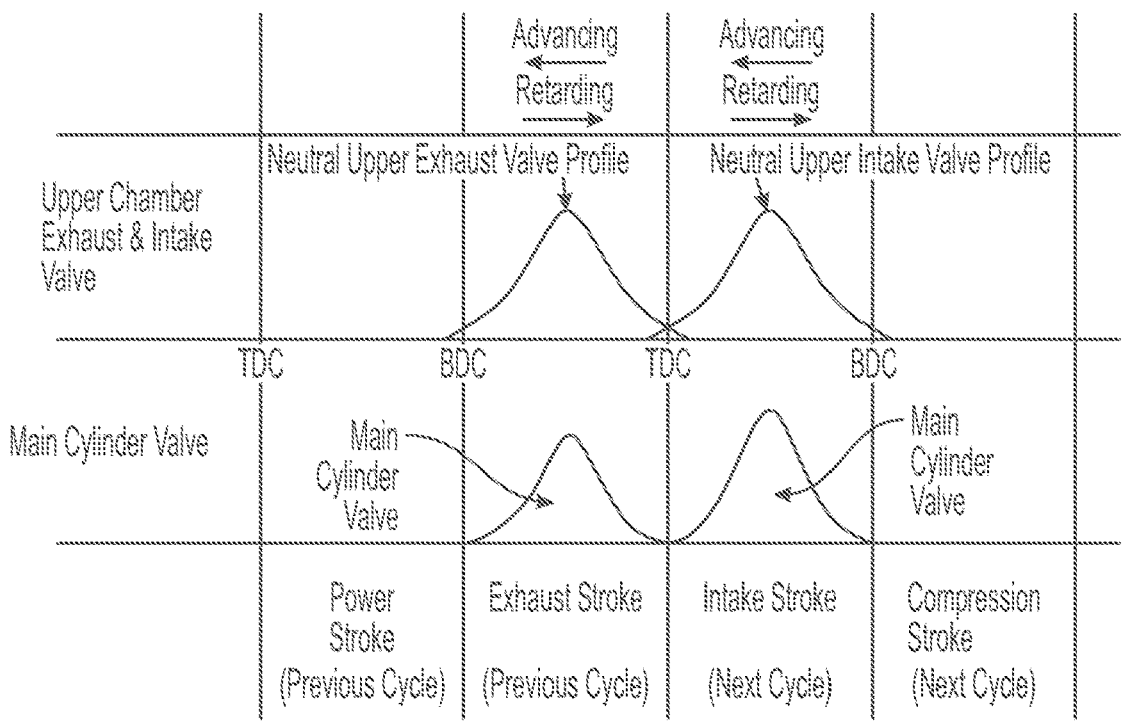
FIG. 11B is a valve profile of operating an engine in an exemplary full displacement mode according to the present disclosure.

FIG. 11B is a valve profile of the combustion engine 10 operating in a full displacement mode. For example, the engine 10 can be a 2.0 liter, 4 stoke cycle engine. The upper intake valve(s) 32 and the upper exhaust valve(s) 33 can both be at a neutral timing, and can both be in phase (i.e., overlap) with the main valve(s) 31 timing. However, a valve duration of the upper intake valve(s) 32 and the upper exhaust valve(s) 33 is greater than the valve duration of the main valve(s) 31. In the exhaust stroke, the upper exhaust valve(s) 33 opens slightly before the main valve(s) 31 opens and closes slightly after TDC of the intake stroke. In the intake stroke, the upper intake valve(s) 32 opens slightly before TDC and closes slightly after BDC.

FIGS. 12A-12E are depictions showing intake air 44 and exhaust gas 43 during a sequence of strokes of the engine 10 in a full displacement mode. For example, the engine 10 can be a 2.0 liter, 4 stoke cycle engine.

Figure 12A:
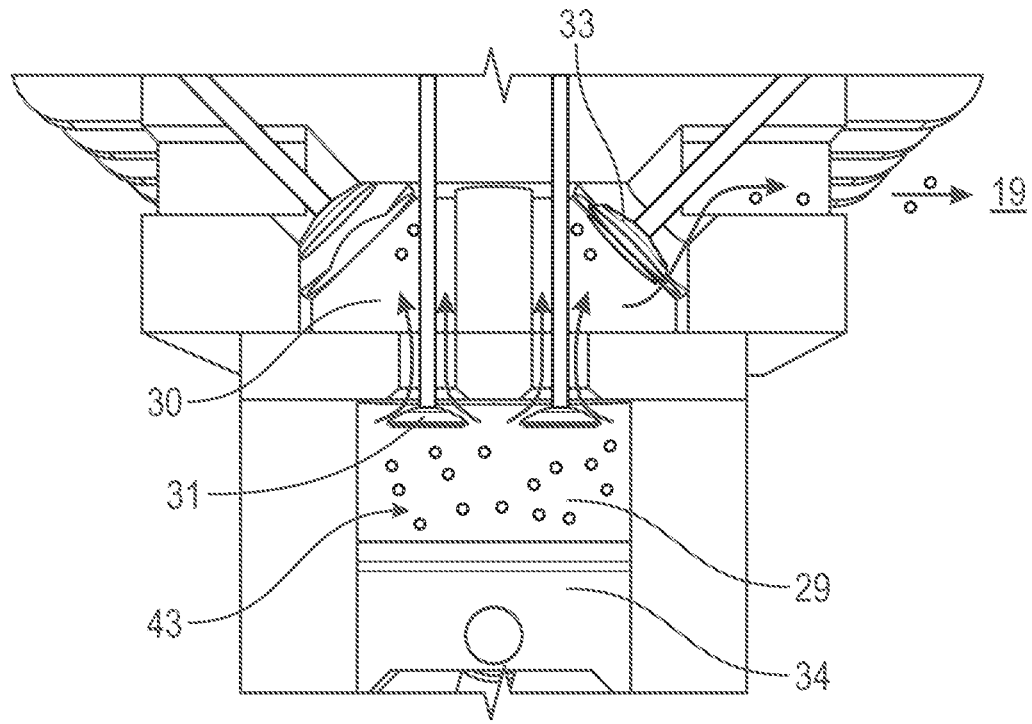
FIGS. 12A-12E are a sequence of partial cross-sectional views of operating an engine in an exemplary full displacement mode to the present disclosure.

FIG. 12A depicts an exhaust stroke of a previous cycle. After BDC, the main valves 31 open. The upper exhaust valves 33 open. Upward movement of the piston 34 pushes exhaust gas 43 out of the main combustion cylinder 29, into the upper non-combustion chamber 30, and out into the exhaust manifold 19.

Figure 12B:
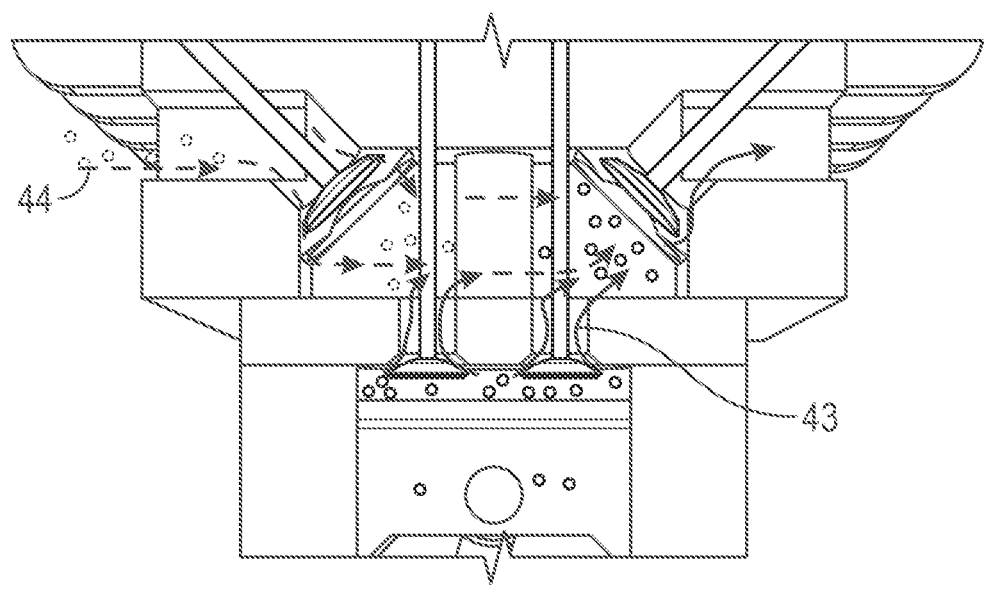

FIG. 12B depicts a late stage of the exhaust stroke of the previous cycle. The upper exhaust valves 33 remain open. Further upward movement of the piston 34 pushes remaining exhaust gas 43 into the upper non-combustion chamber 30. The upper intake valves 32 start to open, incoming intake air 44 pushes the exhaust gas 43 out of the upper non-combustion chamber 30 and to the upper exhaust valves 33, and then into the exhaust manifold 19.

Figure 12C:
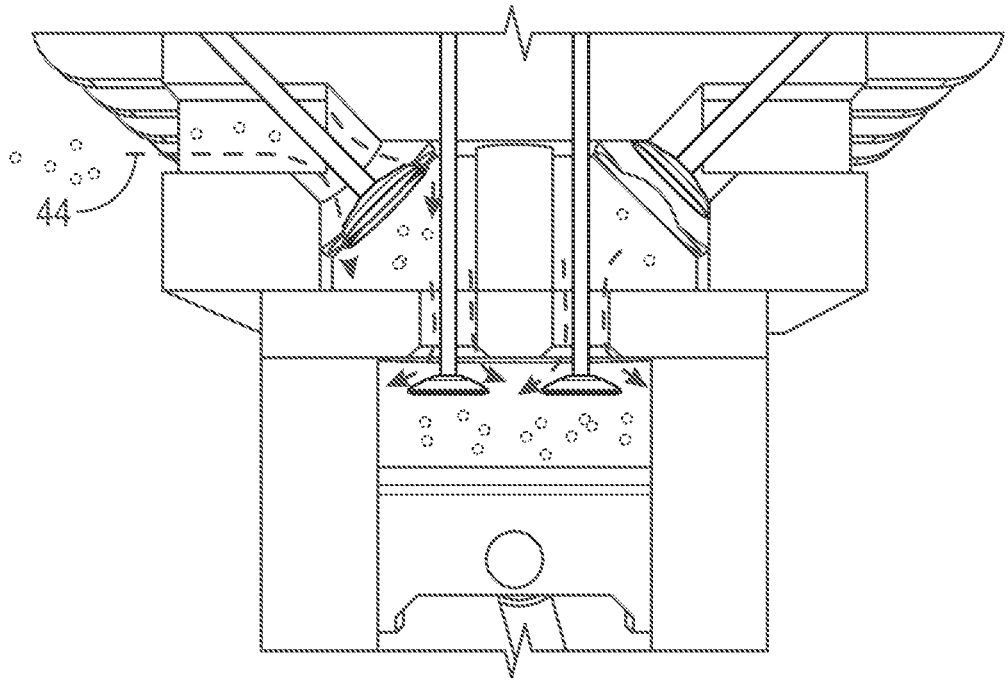

FIG. 12C depicts the intake stroke of the next cycle. The upper exhaust valves 33 close and the main valves 31 open at the beginning of the intake stroke. Downward movement of the piston 34 draws the intake air 44 into the main combustion cylinder 29.

Figure 12D:
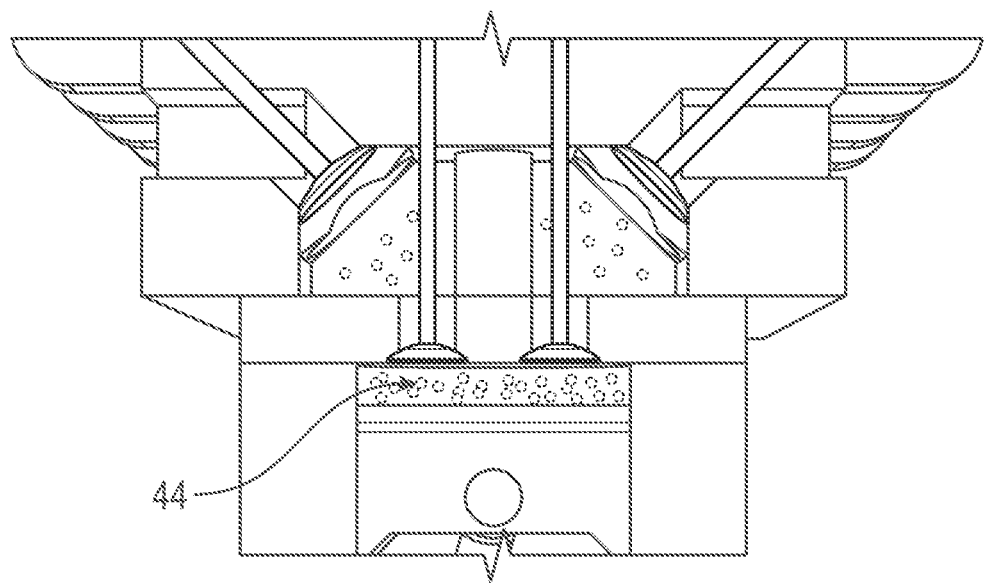

FIG. 12D depicts the compression stroke of the next cycle. The intake air 44 is compressed in the main combustion cylinder 29 and is ready for combustion burning.

Figure 12E:
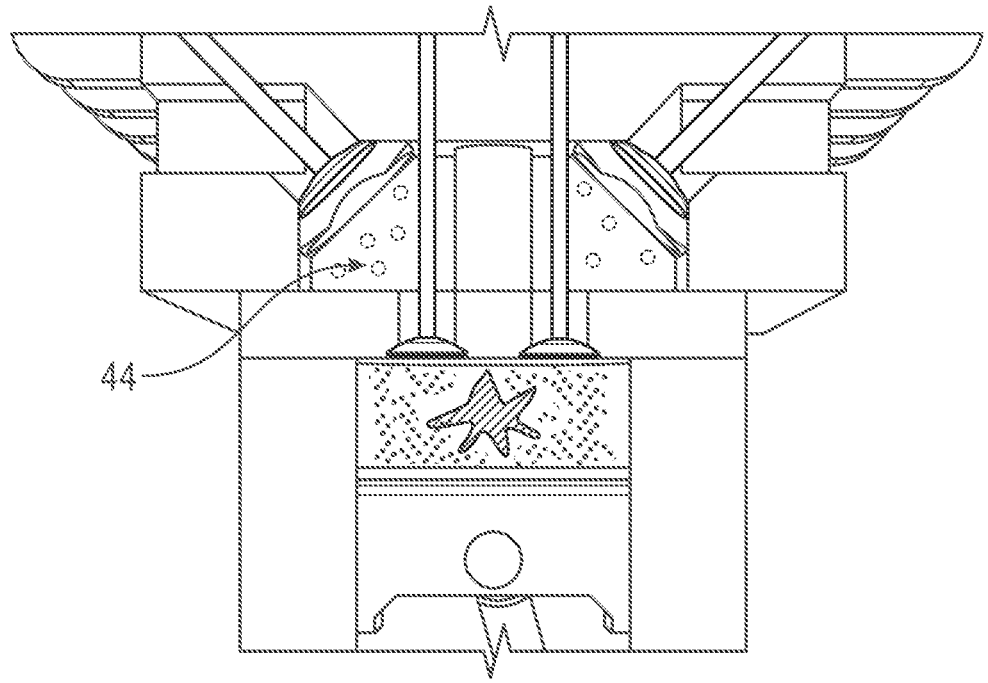

FIG. 12E depicts the power stroke of the next cycle. The upper intake valves 32 and the upper exhaust valves 33 close. The main valves 31 close. Combustion pushes downward on the piston 34 to turn the crankshaft 22.

Figure 13:
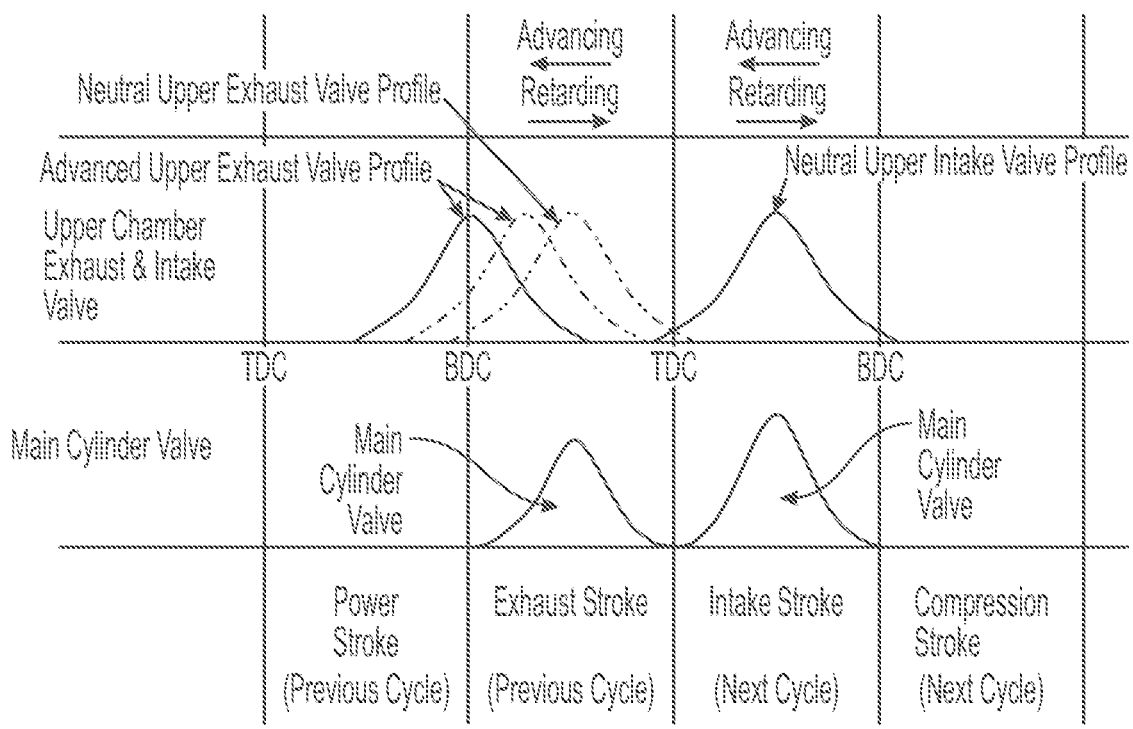
FIG. 13 is a valve profile of operating an engine in an exemplary partial displacement mode according to the present disclosure.

FIG. 13 is a valve profile of the combustion engine 10 operating in a partial displacement mode using advanced timing. The upper intake valve(s) 32 can be at a neutral timing and can be in phase (i.e., overlap) with the main valve(s) 31 timing. The upper exhaust valve(s) 33 can be at an advanced timing. Advancing the upper exhaust valve(s) 33 timing can have the effect of opening and closing the upper exhaust valve(s) 33 in advance of the main valve(s) 31 opening and closing. Advancing the upper exhaust valve(s) 33 timing can decrease overlap with the main valve(s) 31 during the exhaust cycle. The amount of advancing of the upper exhaust valve(s) 33 can dictate the amount of exhaust gas 43 that can be collected and held in the upper non-combustion chamber(s) 30.

FIGS. 14A-14E are depictions showing intake air 44 and exhaust gas 43 during a sequence of strokes of the engine 10 in a partial displacement mode, with upper exhaust valves 33 advanced.

Figure 14A:
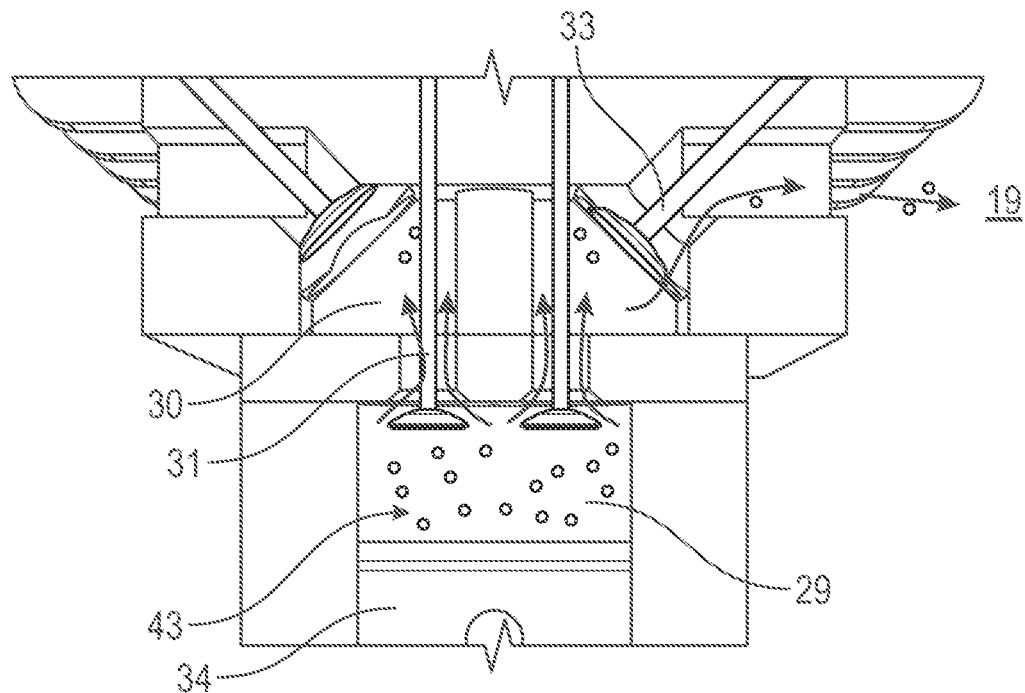
FIGS. 14A-14E are a sequence of partial cross-sectional views of operating an engine in an exemplary partial displacement mode according to the present disclosure.

FIG. 14A depicts an exhaust stroke of a previous cycle. Before BDC, the upper exhaust valves 33 open. Slightly after BDC, the main valves 31 open. Upward movement of the piston 34 pushes exhaust gas 43 out of the main combustion cylinder 29, into the upper non-combustion chamber 30, and out into the exhaust manifold 19.

Figure 14B:
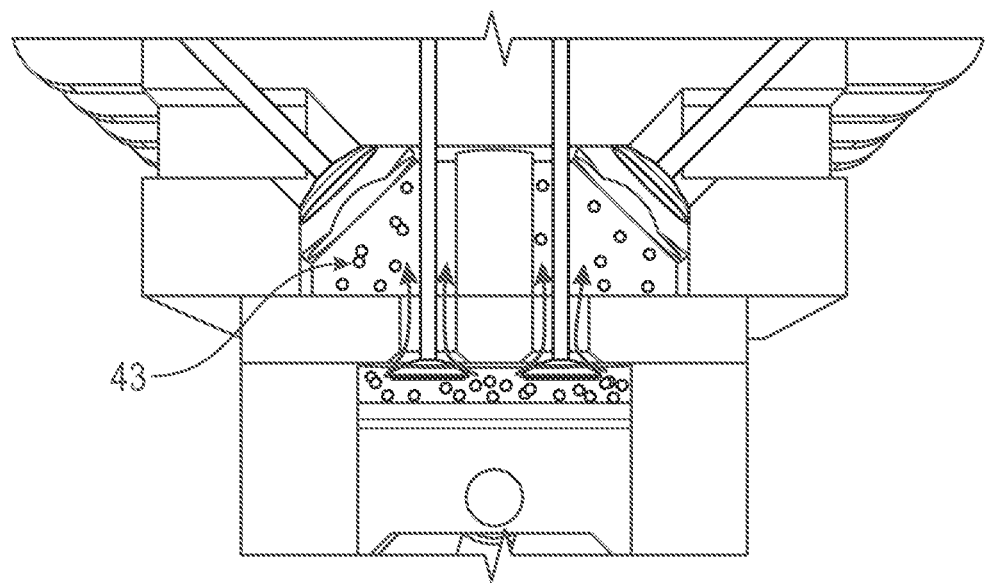

FIG. 14B depicts a late stage of the exhaust stroke of the previous cycle. The upper exhaust valves 33 and the upper intake valves 32 close. While the main valves 31 are open, further upward movement of the piston 34 pushes remaining exhaust gas 43 into the upper non-combustion chamber 30.

Figure 14C:
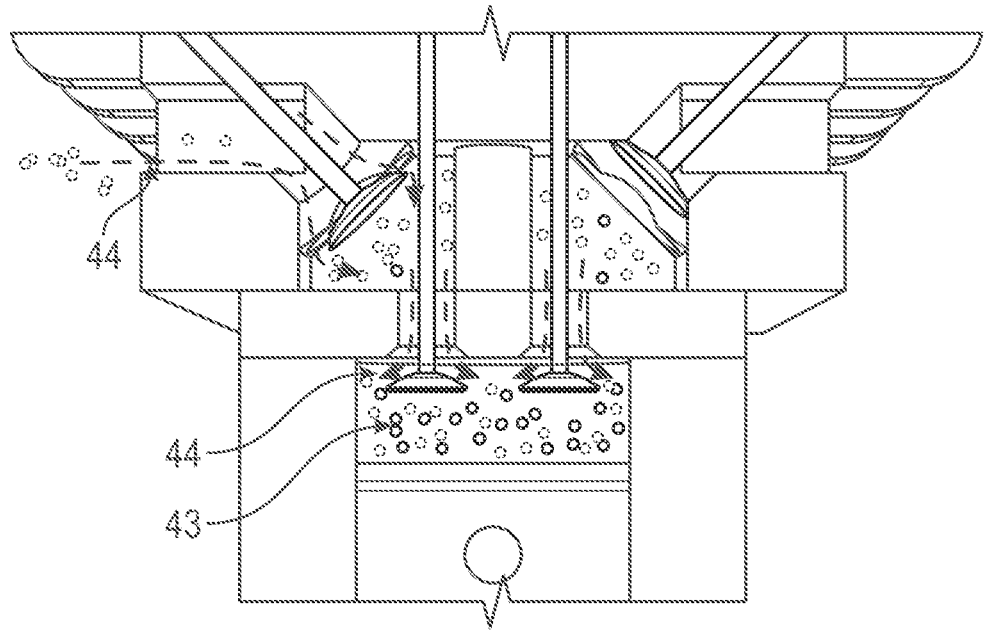

FIG. 14C depicts the intake stroke of the next cycle. The upper intake valves 32 open slightly before TDC and slightly before the beginning of the intake stroke. The upper exhaust valves 33 close and the main valves 31 open at the beginning of the intake stroke. Downward movement of the piston 34 draws the exhaust gas 43 from the upper non-combustion chamber 30 and then the intake air 44 from the upper non-combustion chamber 30 into the main combustion cylinder 29. The exhaust gas 43 in the upper non-combustion chamber 30 can displace a portion of the incoming intake air 44.

Figure 14D:
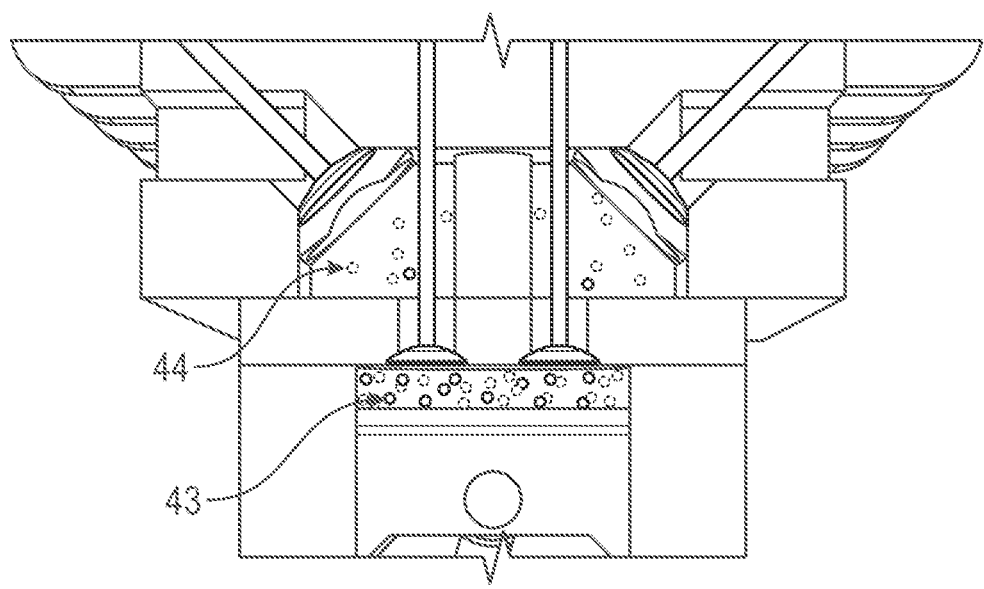

FIG. 14D depicts the compression stroke of the next cycle. All valves are closed. The intake air 44 is compressed with the exhaust gas 43 in the main combustion cylinder 29 and is ready for combustion burning.

Figure 14E:
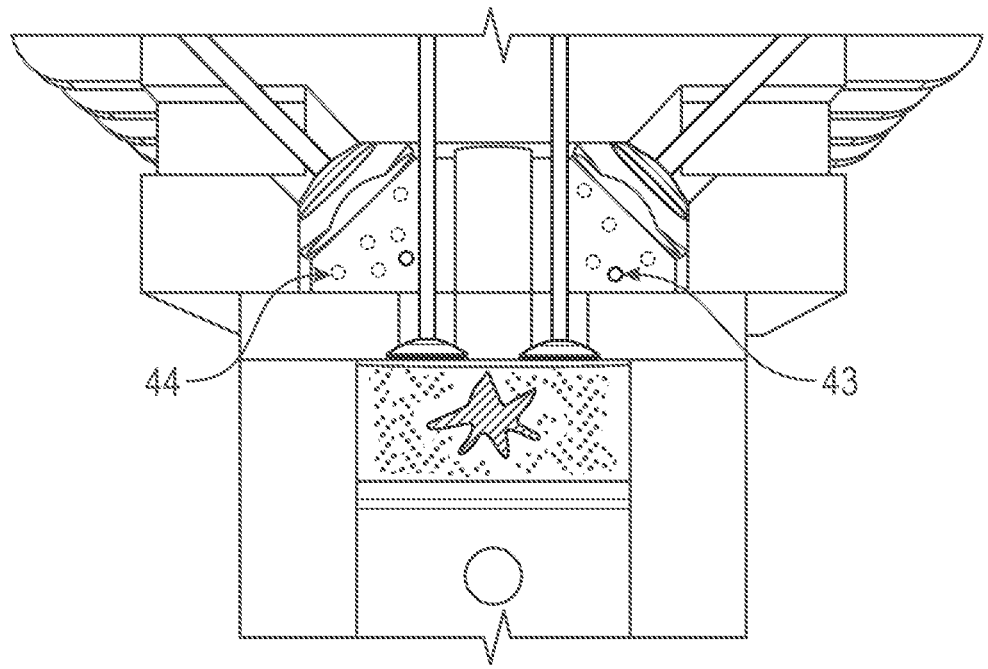

FIG. 14E depicts the power stroke of the next cycle. The upper intake valves 32 and the upper exhaust valves 33 close. The main valves 31 close. Combustion pushes downward on the piston 34 to turn the crankshaft 22.

Figure 15:
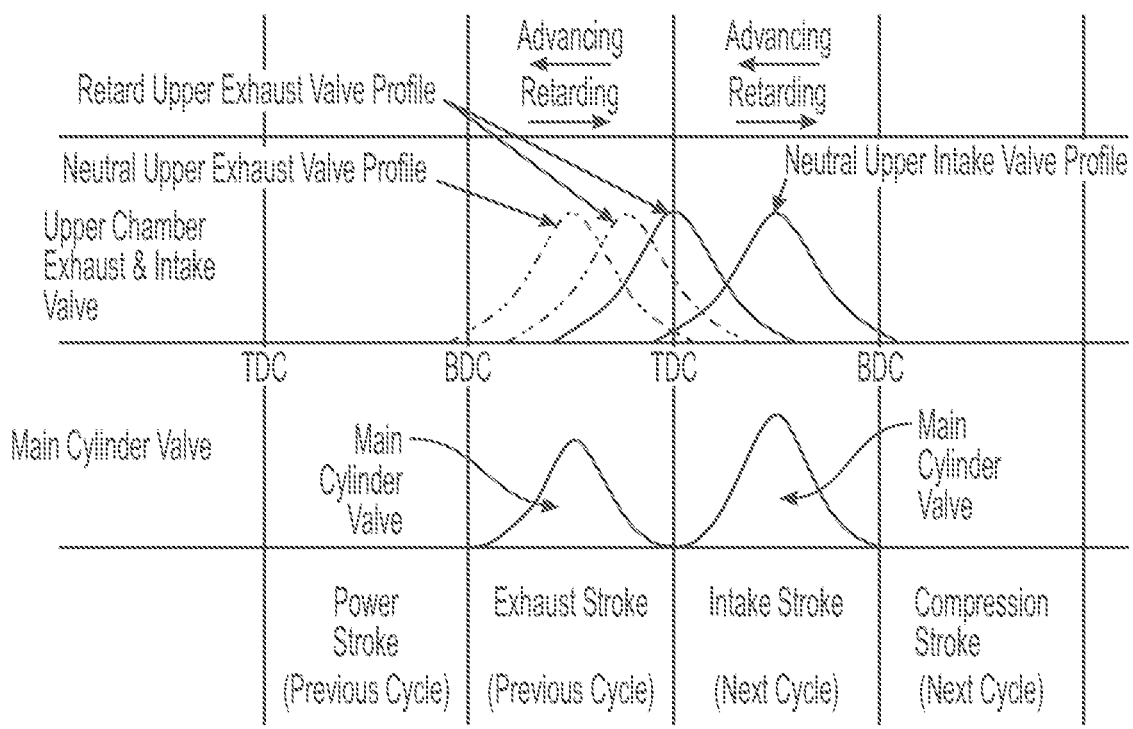
FIG. 15 is a valve profile of operating an engine in another exemplary partial displacement mode according to the present disclosure.

FIG. 15 is a valve profile of the combustion engine 10 operating in a partial displacement mode using retarded timing. The upper intake valve(s) 32 can be at a neutral timing and can be in phase (i.e., overlap) with the main valve(s) 31 timing. The upper exhaust valve(s) 33 can be at a retarded timing. Retarding the upper exhaust valve(s) 33 timing can have the effect of opening and closing the upper exhaust valve(s) 33 after the main valve(s) 31 opening and closing. Retarding the upper exhaust valve(s) timing can decrease overlap with the main valve(s) 31 during the exhaust cycle. The amount of retarding of the upper exhaust valve(s) 33 can dictate the amount of exhaust gas 43 that can be collected and held in the upper non-combustion chamber(s) 30.

In the partial displacement modes depicted in FIGS. 13 and 15, the timing of the upper exhaust valves 33 can dictate the amount of exhaust gas 43 collected (i.e., trapped) in the upper non-combustion chamber 30. The more advanced or retarded the timing, the more exhaust gas 43 is collected in the upper non-combustion chamber 30. The more exhaust gas 43 collected, the more intake air 44 is displaced from the upper non-combustion chamber 30. Using exhaust gas 43 to displace intake air 44 can operate a 2.0 liter engine as a 1.0 liter engine, for example, if the upper non-combustion chamber 30 is filled with 1.0 liters of intake air 44 and 1.0 liters of exhaust gas 43. Because exhaust gas 43 cannot burn twice, the amount of needed fuel is based on 1.0 liters of intake air 44. The compression ratio of a 2.0 liter engine burning 2.0 liters of intake air 44 will be similar to an engine burning 1.0 liters of intake air 44 and 1.0 liters of exhaust gas 43. But there is a fuel savings in the latter.

Figure 16:
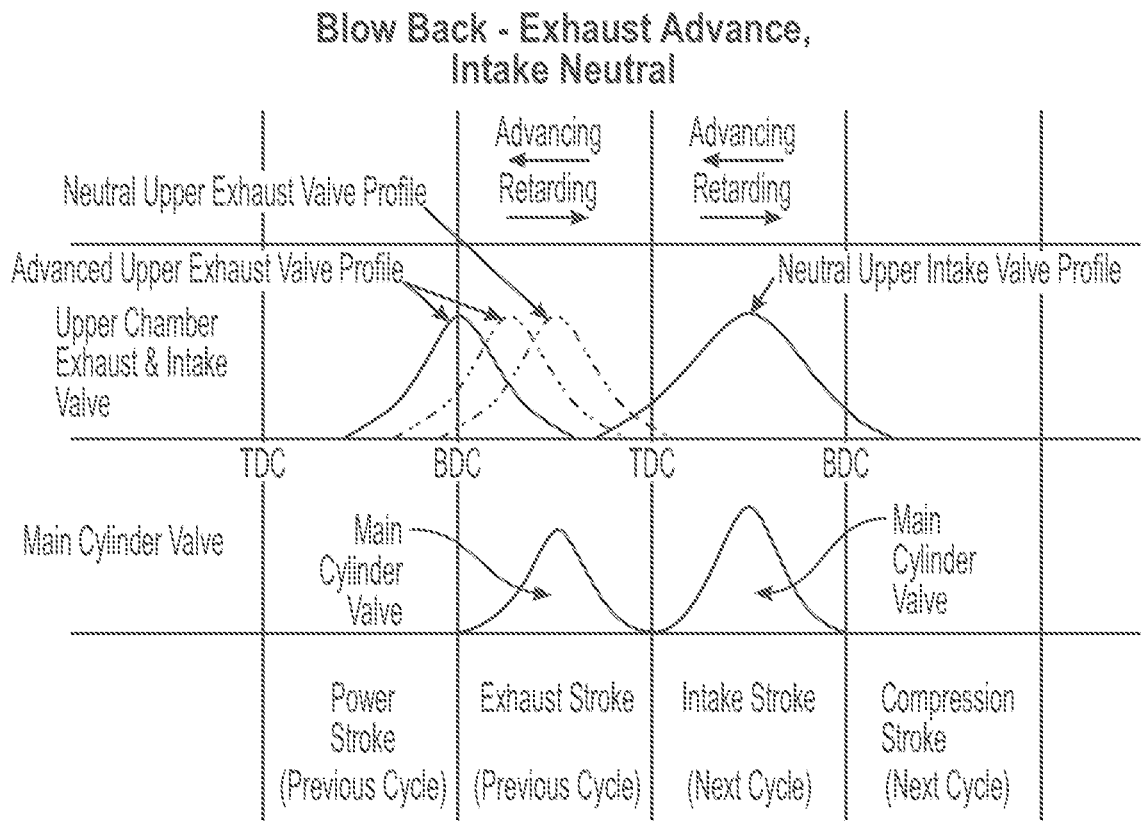
FIG. 16 is a valve profile of operating an engine in an exemplary blow back mode according to the present disclosure.

FIG. 16 is a valve profile of the combustion engine 10 operating in a blow back mode. The upper intake valve(s) 32 can be at a neutral timing and can be in phase (i.e., overlap) with the main valve(s) 31 timing. The upper exhaust valve(s) 33 can be at an advanced timing. The upper exhaust valve(s) 33 can open before BDC. There is some overlap between the upper exhaust valve(s) 33 and the main valve(s) 31.

The upper intake valve(s) 32 can have a longer valve duration than a main valve(s) 31 duration. With the longer upper intake valve 32 duration, there can be greater overlap between the upper intake valve 32 duration and the main valve 31 duration during a late stage of the exhaust stroke. Alternatively, the upper intake valve(s) 32 may be advanced to provide greater overlap with the upper exhaust valve(s) 33 timing. For exhaust gas 43 to flow from the main combustion cylinder(s) 29, into the upper non-combustion chamber(s) 30, and then to the intake manifold 18, the upper intake valve(s) 32 can open before the intake stroke and give sufficient time for the exhaust gas 43 to flow back to the intake manifold 18.

FIGS. 17A-17E are depictions showing intake air 44 and exhaust gas 43 during a sequence of strokes of the engine 10 in a blow back mode. Blow back mode can be used for a combustion engine 10 that is designed with a small upper non-combustion chamber 30.

Figure 17A:
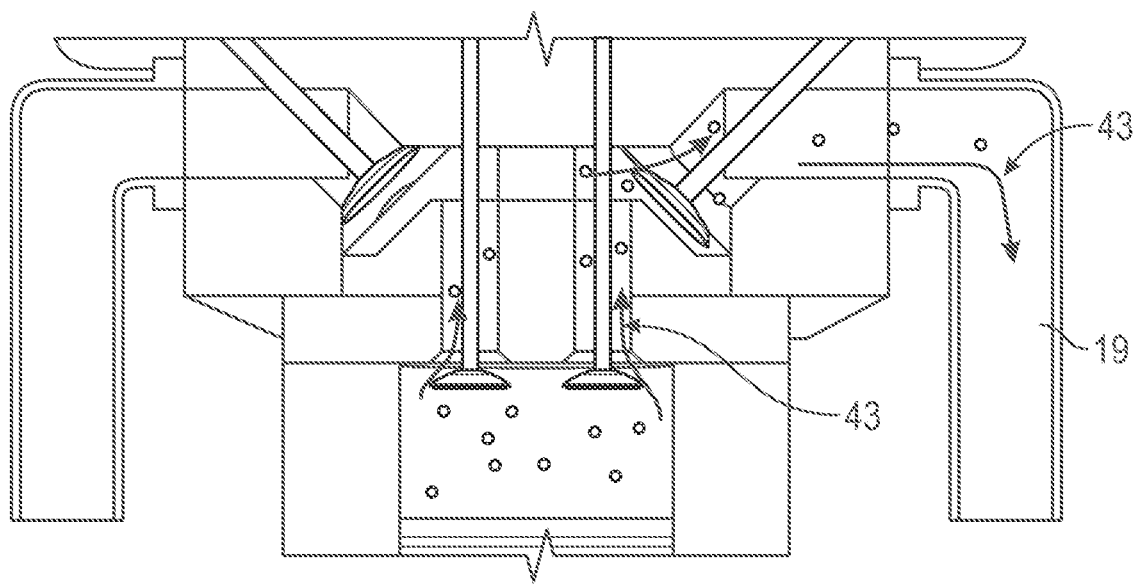
FIGS. 17A-17E are a sequence of partial cross-sectional views of operating an engine in an exemplary blow back mode according to the present disclosure.

FIG. 17A depicts an exhaust stroke of a previous cycle. Upward movement of the piston 34 pushes exhaust gas 43 into the upper non-combustion chamber 30 and out to the exhaust manifold 19.

Figure 17B:
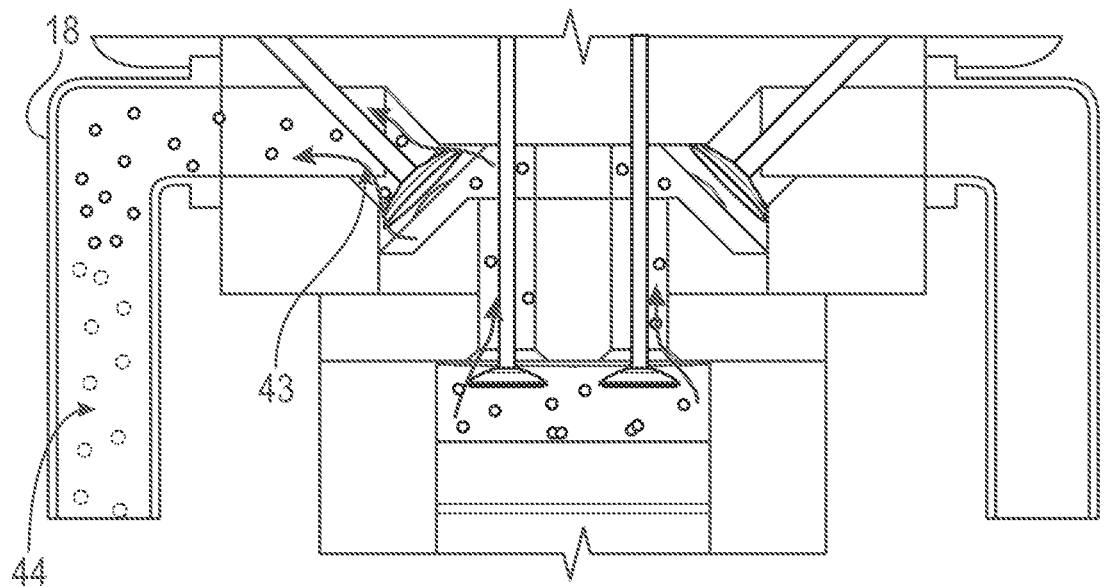

FIG. 17B depicts a late stage of the exhaust stroke of the previous cycle. Early closing of the upper exhaust valves 33 and early opening of the upper intake valves 32 leads to the exhaust gas 43 flowing into the upper non-combustion chamber 30 and out into the intake manifold 18. At that time, the intake manifold 18 acts as a reservoir for the exhaust gas 43 and the intake air 44 to be used in the next cycle.

Figure 17C:
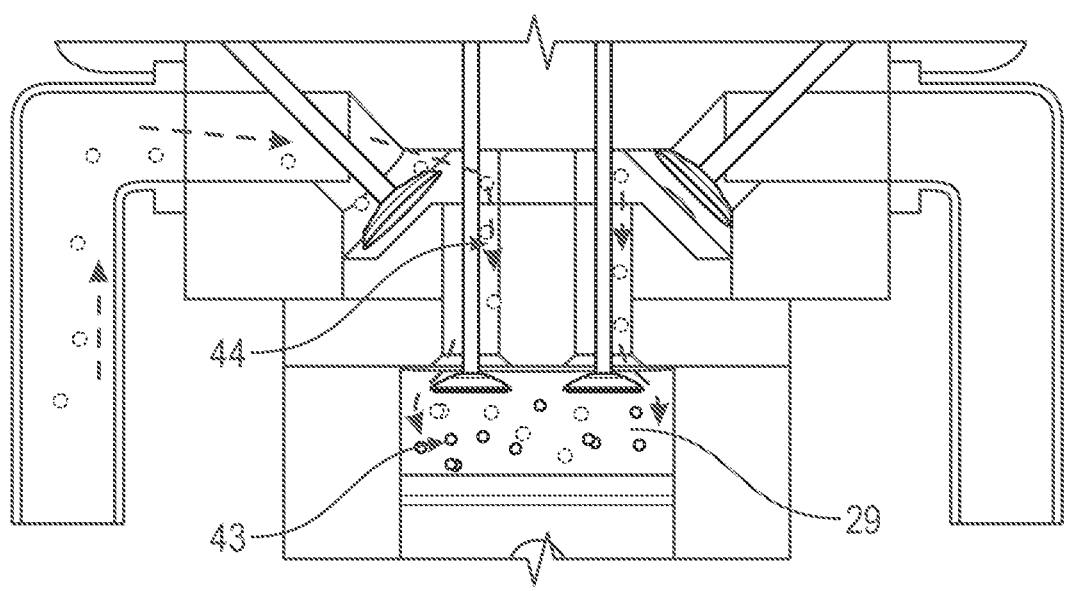

FIG. 17C depicts the intake stroke of the next cycle. Downward movement of the piston 34 draws the exhaust gas 43 and the intake air 44 from the intake manifold 18, through the upper non-combustion chamber 30, and into the main combustion cylinder 29.

Figure 17D:
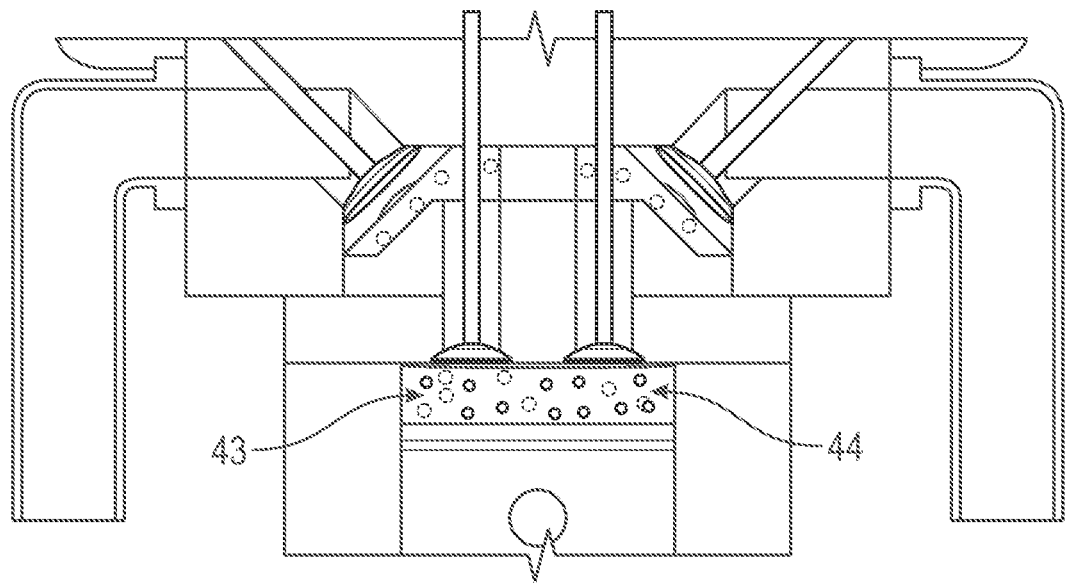

FIG. 17D depicts the compression stroke of the next cycle. All valves are closed. The intake air 44 is compressed with the exhaust gas 43 in the main combustion cylinder 29 and is ready for combustion burning.

Figure 17E:
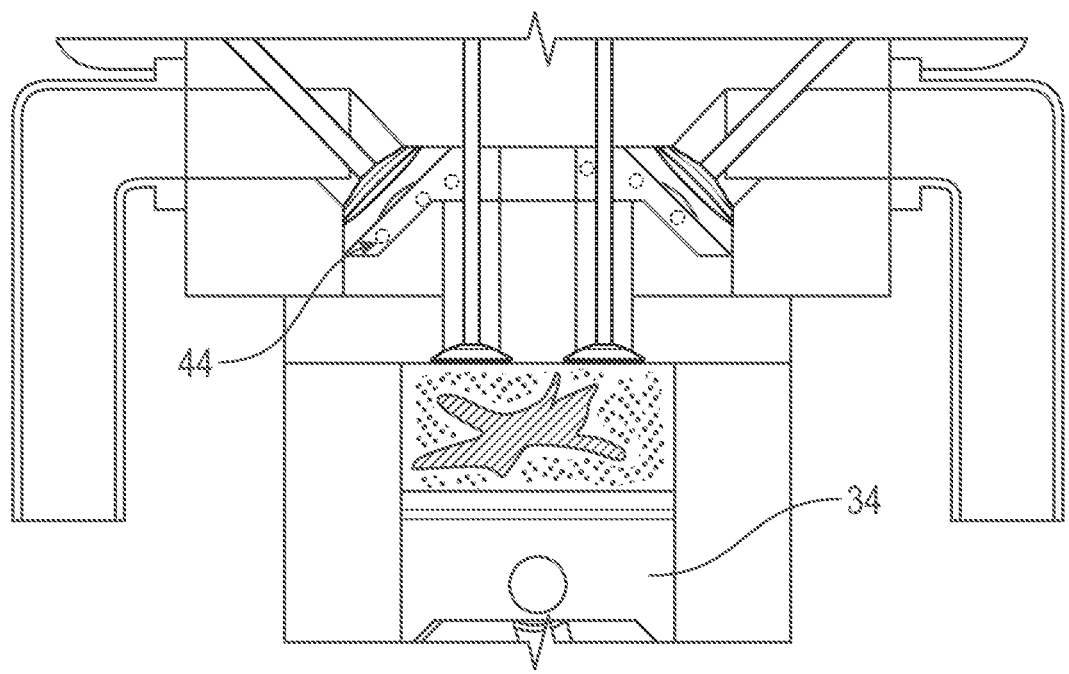

FIG. 17E depicts the power stroke of the next cycle. All valves are closed. Combustion pushes downward on the piston 34 to turn the crankshaft 22.

FIG. 18 is a flowchart of a method 70 of varying engine mode to either an Otto cycle mode or an Atkinson cycle mode, according to an embodiment. The method 70 may start at a step 72 by determining an engine performance, such as by an accelerator pedal position sensor, engine revolutions per minute (RPM) sensor, mass air flow (MAF) sensor, and wheel speed sensor. At a step 73, it can be determined, such as by the controller 42, whether maximum horsepower output is required.

If "yes" at step 73, then at a step 74, it can be determined, such as by the controller 42, that the Otto cycle mode is to be implemented. At a step 75, the upper intake valve(s) 32 may be adjusted, such as by the controller 42 controlling the upper intake valve phaser(s) 13, to a neutral timing. At a step 76, a fuel injection rate may be adjusted, such as by the controller 42 controlling the fuel injector(s) 38, to a normal rate.

If "no" at step 73, then at a step 77, it can be determined, such as by the controller 42, that the Atkinson cycle mode is to be implemented. At a step 78, the upper intake valve(s) 32 may be adjusted, such as by the controller 42 controlling the upper intake valve phaser(s) 13, to an advanced timing. At a step 80, a fuel injection rate may be adjusted, such as by the controller 42 controlling the fuel injector(s) 38, to a lower rate. Following the step 77, instead of step 78, at a step 79, the upper intake valve(s) 32 may be adjusted, such as by the controller 42 controlling the upper intake valve phaser(s) 13, to a retarded timing. At a step 81, a fuel injection rate may be adjusted, such as by the controller 42 controlling the fuel injector(s) 38, to a lower rate.

Figure 19A:
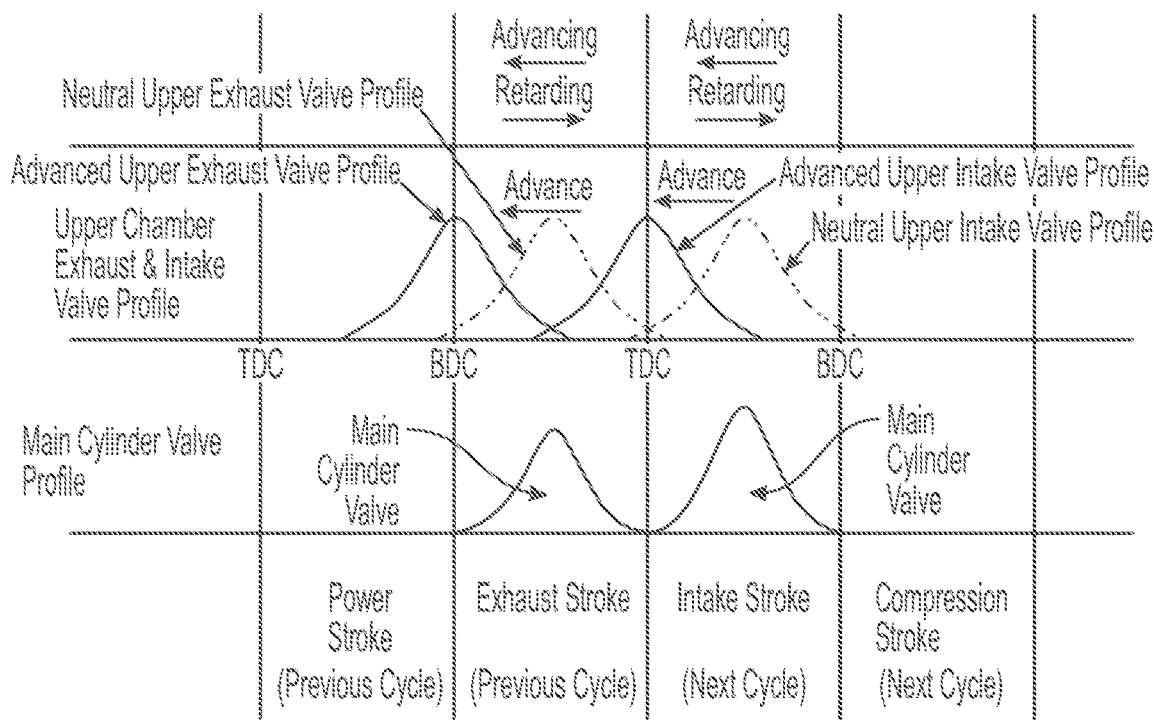
FIGS. 19A-19I are valve profiles of operating an engine in exemplary Otto cycle and Atkinson cycle modes according to the present disclosure.

FIG. 19A is a valve profile of the combustion engine 10 operating in an Atkinson cycle mode—with exhaust advanced and intake advanced.

Advancing the upper exhaust valve 33 timing during the power/exhaust strokes leads to an early valve opening in the power stroke and an early closing in the exhaust stroke. The early upper exhaust valve 33 opening in the power stroke has no effect on engine operation. However, the early closing of the upper exhaust valve 33 in the exhaust stroke restricts and limits the amount of exhaust gas 43 that can be expelled out of the engine block 11 via the main valve 31 and the upper exhaust valve 33. Because of the early closing of the upper exhaust valve 33, exhaust gas 43 can remain in the upper non-combustion chamber 30 and some exhaust gas 43 can be "blown back" into the intake manifold 18 when the upper intake valve 32 opens. The exhaust gas 43 can remain in the intake manifold 18 until the intake stroke occurs.

Gases require a full duration of the intake stroke to fill the main combustion cylinder 29 via the main valve 31 and upper intake valve 33. Advancing the upper intake valve 32 closing during intake stroke leads to a decrease in gas volume entering the main combustion cylinder 29 for compression and leads to a smaller compression stroke than the expansion stroke-like the Atkinson engine.

During the intake stroke, the exhaust gas 43 that is present in the upper non-combustion chamber 30 will be introduced back into the main combustion cylinder 29 via the main valve 31. The presence of exhaust gas 43 in the main combustion cylinder 29 acts as a filler to displace intake air 44. The more exhaust gas 43 that is in the upper non-combustion chamber 30 during intake stroke, the more intake air 44 is being displaced, and thus less fuel is required to burn with the intake air 44 and vice versa. The presence of exhaust gas 43 in the upper non-combustion chamber 30 and in the intake manifold 18 leads to a partial displacement capacity.

Figure 19B:
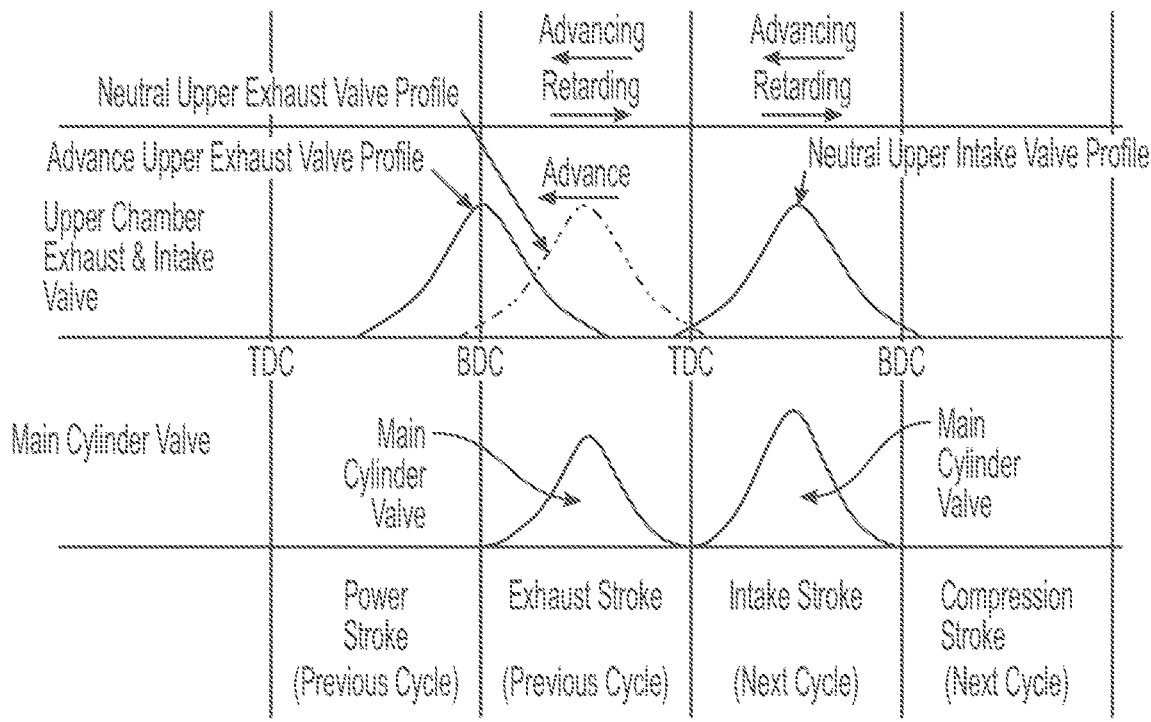

FIG. 19B is a valve profile of the combustion engine 10 operating in an Otto cycle mode—with exhaust advanced and intake neutral.

Advancing the upper exhaust valve 33 timing during the power/exhaust strokes leads to an early valve opening in the power stroke and an early closing in the exhaust stroke. The early upper exhaust valve 33 opening in the power stroke has no effect on engine operation. However, the early closing of the upper exhaust valve 33 in the exhaust stroke restricts and limits the amount of exhaust gas 43 that can be expelled out of the engine block 11 via the main valve 31 and the upper exhaust valve 33. Because of the early closing of the upper exhaust valve 33, exhaust gas 43 can remain in the upper non-combustion chamber 30 and some exhaust gas 43 can be "blown back" into the intake manifold 18 when the upper intake valve 32 opens. The exhaust gas 43 can remain in the intake manifold 18 until the intake stroke occurs.

If the timing of the upper exhaust valve 33 is aggressively advanced, then a larger volume of exhaust gas 43 would be present in the upper non-combustion chamber 30. If the advancement of the upper exhaust valve 33 timing is minimal, then the volume of the exhaust gas 43 in the upper non-combustion chamber 30 is smaller.

During the intake stroke, the exhaust gas 43 that is present in the upper non-combustion chamber 30 will be introduced back into the main combustion cylinder 29 via the main valve 31. The piston 34 downward force produces a vacuum that draws exhaust gas 43 from the upper non-combustion chamber 30 and intake air 44 from intake manifold 18 into the main combustion cylinder 29 via the main valve 31 and the upper intake valve 32. The presence of exhaust gas 43 in the main combustion cylinder 29 act as a filler to displace intake air 44. The exhaust gas 43 does not burn. Therefore, the more exhaust gas 43 that is present in the upper non-combustion chamber 30 during intake stroke, the more intake air 44 is displaced, and thus less fuel is required to burn with the intake air 44 and vice versa. The exhaust gas 43 has displaced a portion of intake air 44 during intake stroke and in the compression stroke; therefore, the engine is running at a partial displacement capacity.

The upper intake valve 32 timing is neutral; therefore, there is no restriction or shorter intake stroke duration and thus the engine operates in the Otto cycle mode.

Figure 19C:
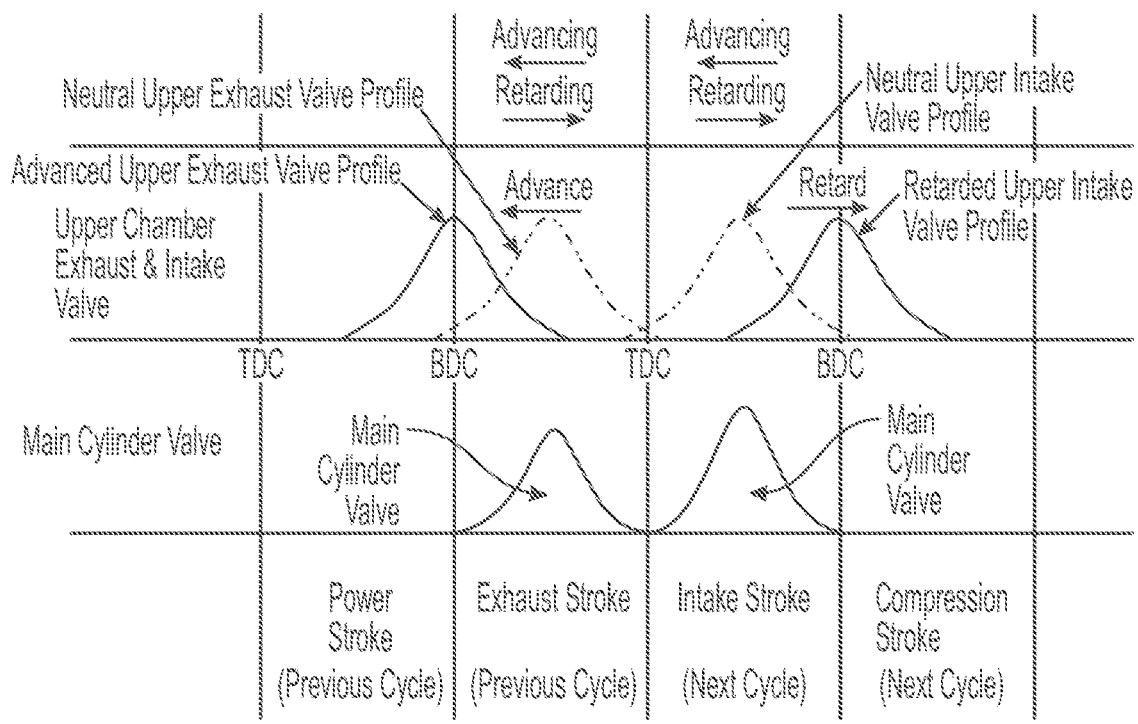

FIG. 19C is a valve profile of the combustion engine 10 operating in an Atkinson cycle mode—with exhaust advanced and intake retarded.

Advancing the timing of the upper exhaust valve 33 leads to the presence of exhaust gas 43 in the upper non-combustion chamber 30 at the beginning of the intake stroke. In turn, exhaust gas 43 displaces intake air 44 in the main combustion cylinder 29 during the intake stroke and the compression stroke. The presence of exhaust gas 43 in the main combustion cylinder 29 during the compression stroke changes the engine from full displacement capacity to partial displacement capacity.

Retarding the timing of the upper intake valve 32 leads to its late opening in the intake stroke. The late opening leads to gases having less time to flow and fill the main combustion cylinder 29 via upper intake valve 32 and the main valve 31. The effect is that velocity of gases from the upper non-combustion chamber 30 and the intake manifold 18 will increase to fill the main combustion cylinder 29. More aggressive retarding of the upper intake valve also decreases the gas volume that can enter the main combustion cylinder 29 from the upper non-combustion chamber 30 and the intake manifold 18 via the upper intake valve 32 and the main valve 31. During the intake stroke, gases require a full intake stroke duration to fill the main combustion cylinder. Therefore, aggressive retarding of the upper intake valve 32 decreases the duration for which the gases can enter and fill the main combustion cylinder 29 via the upper intake valve 32 and the main valve 31. That leads to a smaller gas volume to be compressed during the compression stroke and a smaller compression stroke than expansion stroke—like the Atkinson engine.

Figure 19D:
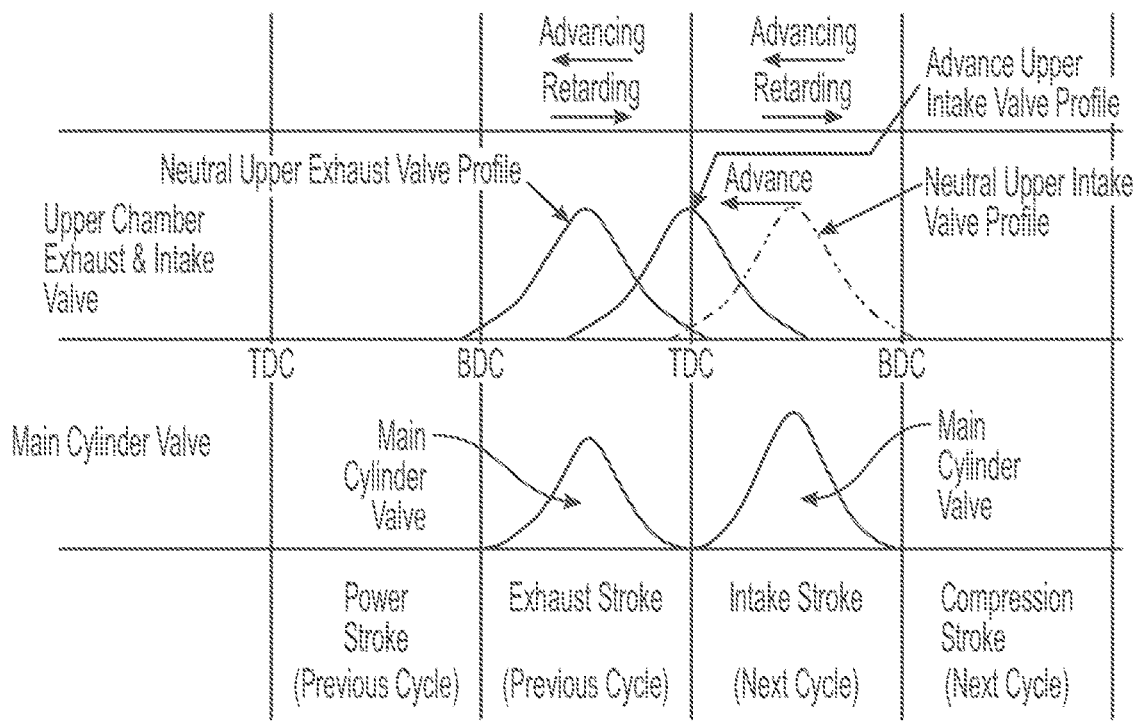

FIG. 19D is a valve profile of the combustion engine 10 operating in an Atkinson cycle mode—with exhaust neutral and intake advanced.

Neutral timing of the upper exhaust valve 33 allows the exhaust gas 43 to fully flow out of the main combustion cylinder 29 and into the upper non-combustion chamber 30 via the main valve 31. Advance timing of the upper intake valve 32 allows the upper intake valve 32 to open during exhaust stroke. The overlap of the upper exhaust valve 33 and the upper intake valve 32 opening at the same time has the effect of the fast-moving exhaust gas 43 pulling the intake air 44 into the exhaust manifold 19 via the upper intake valve 32, the upper non-combustion chamber 30, and the upper exhaust valve 33. The intake air 44 replaces the exhaust gas 43 in the upper non-combustion chamber 30 and exhaust gas 43 will exit out of engine 10 via the upper exhaust valve 33. Aggressive advance upper intake valve 32 timing can lead to greater intake air 44 entering the exhaust manifold 19. This would decrease the overall temperature of the exhaust system and increase the oxygen content in exhaust system.

During the intake stroke, gases require a full intake stroke duration to fill the main combustion cylinder 29 via the main valve 31 and the upper intake valve 32. Advanced timing of the upper intake valve 32 closes the upper intake valve 32 early during the intake stroke. That leads to decreased gas volume entering the main combustion cylinder 29 and leads to smaller compression stroke than expansion stroke-like the Atkinson engine. The engine is running at full displacement capacity because there is no exhaust gas 43 in the upper non-combustion chamber 30 and in the intake manifold 18 during the intake stroke.

Figure 19E:
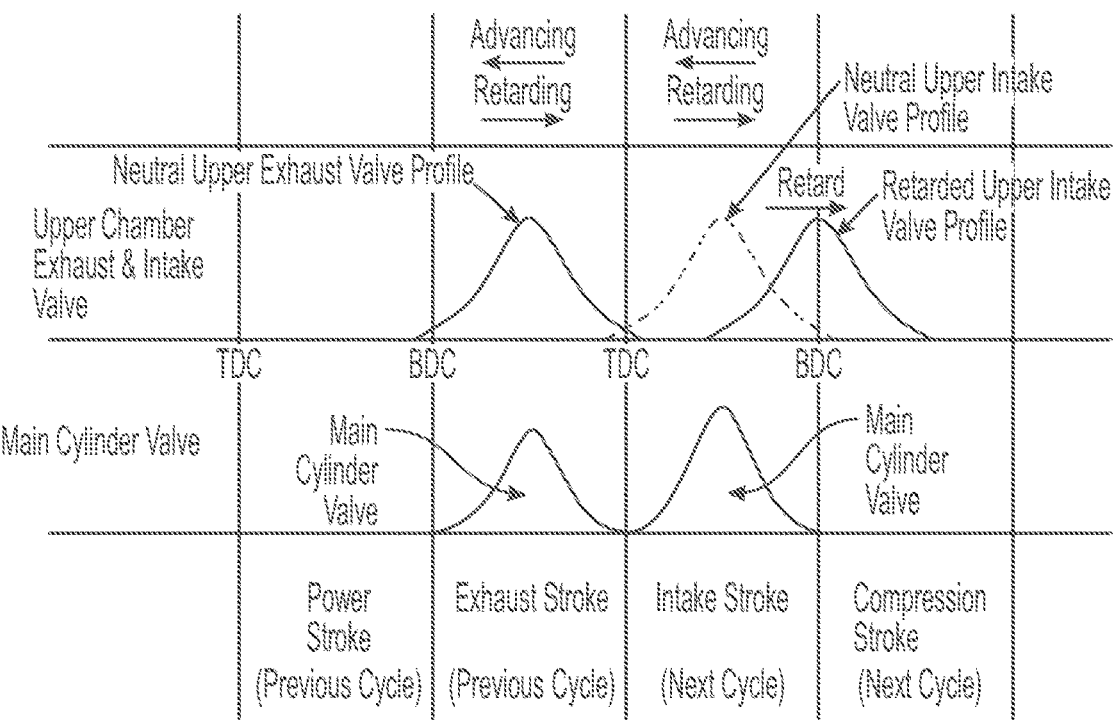

FIG. 19E is a valve profile of the combustion engine 10 operating in an Atkinson cycle mode—with exhaust neutral and intake retarded.

Neutral timing of upper exhaust valve 33 allows for the exhaust gas 43 to be fully expelled from the main combustion cylinder 29 via the main valve 31 and the upper exhaust valve 33. With aggressive timing of the upper intake valve 32—where there is no overlap between the upper exhaust valve 33 and the upper intake valve 32—there will be exhaust gas 43 in the upper non-combustion chamber 30 that reenters the main combustion cylinder 29 during the intake stroke. That makes the engine operate in a partial displacement capacity.

Retarding of the upper intake valve 32 timing leads to the upper intake valve 32 opening late in the intake stroke. The late opening leads to gases having less time to flow and fill the main combustion cylinder 29 via the upper intake valve 32 and the main valve 31. When the upper intake valve 32 opens, the piston 34 downward force creates a vacuum in the main combustion cylinder 29 that increases the velocity of gas flow from the upper non-combustion chamber 30 and from the intake manifold 18 to thereby fill the main combustion cylinder 29 via the main valve 31 and the upper intake valve 32. Aggressive retarding of the upper intake valve 32 timing also decreases the gas volume that can enter the main combustion cylinder 29 from the upper non-combustion chamber 30 and the intake manifold 18 via the upper intake valve 32 and the main valve 31. During the intake stroke, gases require a full intake stroke duration to fill the main combustion cylinder 29. Therefore, aggressive retarding of the upper intake valve 32 decreases the duration during which the gases can enter and fill the main combustion cylinder 29 via the upper intake valve 32 and the main valve 31. That leads to a smaller gas volume to be compressed during the compression stroke and to a smaller compression stroke than the expansion stroke-like the Atkinson engine.

Figure 19F:
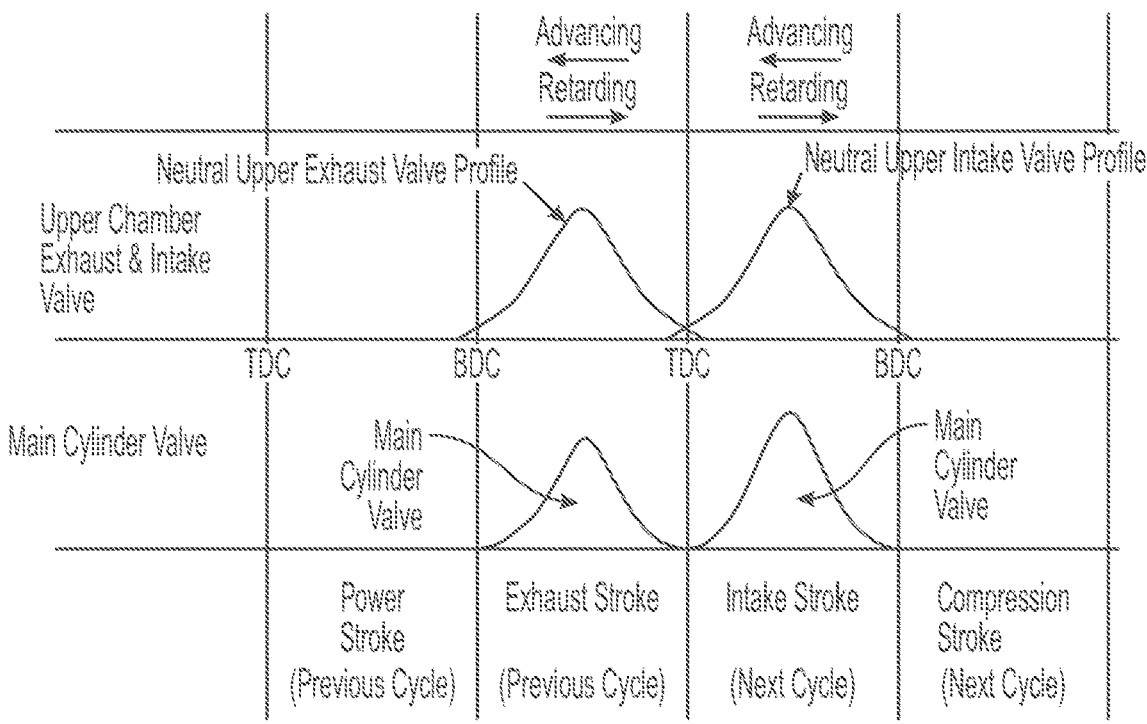

FIG. 19F is a valve profile of the combustion engine 10 operating in an Otto cycle mode—with exhaust neutral and intake neutral.

Neutral timing of the upper intake valve 32 allows it to open during the late stage of the exhaust stroke. Neutral timing of the upper exhaust valve 33 allows it to close at an early stage of the intake stroke to create an overlap of opening between the upper exhaust valve 33 and the upper intake valve 32. The overlap allows the fast-moving exhaust gas 43 to draw the intake air 44 from the intake manifold 18 to the exhaust manifold 19 and replace the exhaust gas 43 in the upper non-combustion chamber 30.

Neutral timing of the upper exhaust valve 33 and the upper intake valve 32 leads to the engine running at a full displacement capacity and an Otto cycle where the compression ratio is equal expansion ratio.

Figure 19G:
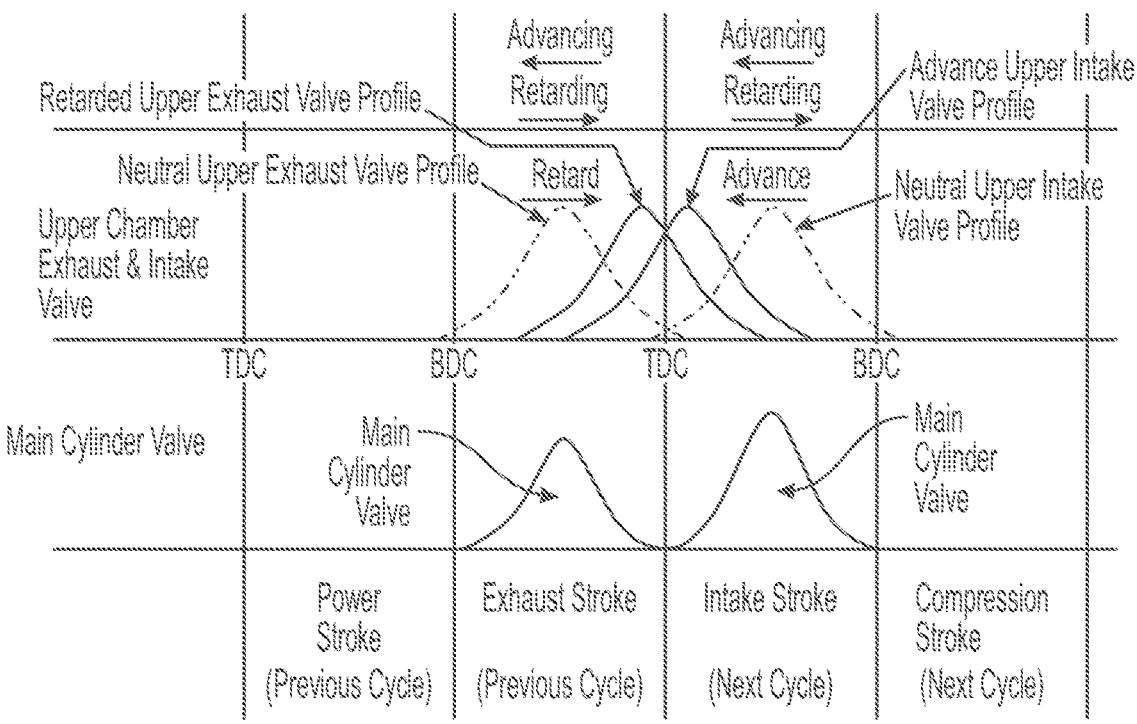

FIG. 19G is a valve profile of the combustion engine 10 operating in an Atkinson cycle mode—with exhaust retarded and intake advanced.

The exhaust stroke requires a full duration to expel the exhaust gas 43 from the main combustion cylinder 29 and out of the engine block 11 via the main valve 31, the upper non-combustion chamber 30, and the upper exhaust valve 33. Retarding the timing of the upper exhaust valve 33 delays the flow of exhaust gas 43 out of the upper non-combustion chamber 30 and into the exhaust manifold 19 via the upper exhaust valve 33. The late opening of the upper exhaust valve 33 causes the exhaust gas 43 to pressurize in the upper non-combustion chamber 30 until the upper exhaust valve 33 opens. Once the upper exhaust valve 33 opens, the exhaust gas 43 will travel at velocity from the upper non-combustion chamber 30 to the exhaust manifold 19 that is higher than normal via the upper exhaust valve 33. Because of the short duration of the upper exhaust valve 33 opening during exhaust stroke, there will be exhaust gas 43 in the upper non-combustion chamber 30 that will be introduced back into the main combustion cylinder 29 via the main valve 31 during the intake stroke leading to a partial displacement capacity.

Advancing the upper intake valve 32 allows it to open earlier than usual in the exhaust stroke which leads to a shorter opening duration during the intake stroke. Intake air 44 will then have a shorter duration to fill up the main combustion cylinder 29 via the upper intake valve 32 and the main valve 31—leading to effects like the Atkinson engine.

Figure 19H:
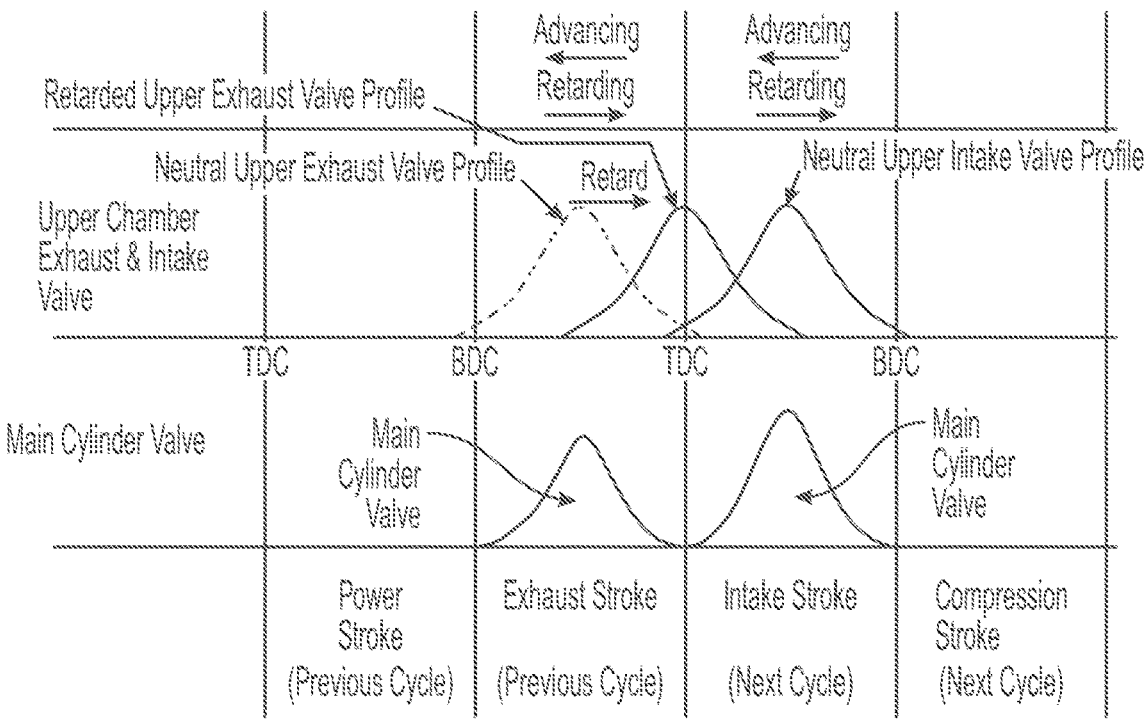

FIG. 19H is a valve profile of the combustion engine 10 operating in an Otto cycle mode—with exhaust retarded and intake neutral.

The exhaust stroke requires full duration to expel the exhaust gas 43 from the main combustion cylinder 29 out of engine via the main valve 31, the upper non-combustion chamber 30, and the upper exhaust valve 33. Retarding the timing of the upper exhaust valve 33 delays the flow of exhaust gas 43 out of the upper non-combustion chamber 30 and into the exhaust manifold 19. The late opening of the upper exhaust valve 33 causes the exhaust gas 43 to pressurize in the upper non-combustion chamber 30 until the upper exhaust valve 33 opens. Once open, the exhaust gas 43 will travel at a velocity from the upper non-combustion chamber 30 to the exhaust manifold 19 that is higher than normal via the upper exhaust valve 33. Because of the short duration of the upper exhaust valve 33 opening during the exhaust stroke there will be exhaust gas 43 in the upper non-combustion chamber 30. That exhaust gas 43 will be reintroduced into the main combustion cylinder 29 via the main valve 31 during the intake stroke leading to partial displacement capacity. The overlap between the upper exhaust valve 33 and the upper intake valve 32 opening happens mostly in the intake stroke; therefore, exhaust gas 43 is present in the upper non-combustion chamber 30 during the intake stroke.

The neutral upper intake valve 32 timing allows for a full intake stoke gas flow duration; therefore, the compression stroke is equal to the expansion stroke like in the Otto engine.

Figure 19I:
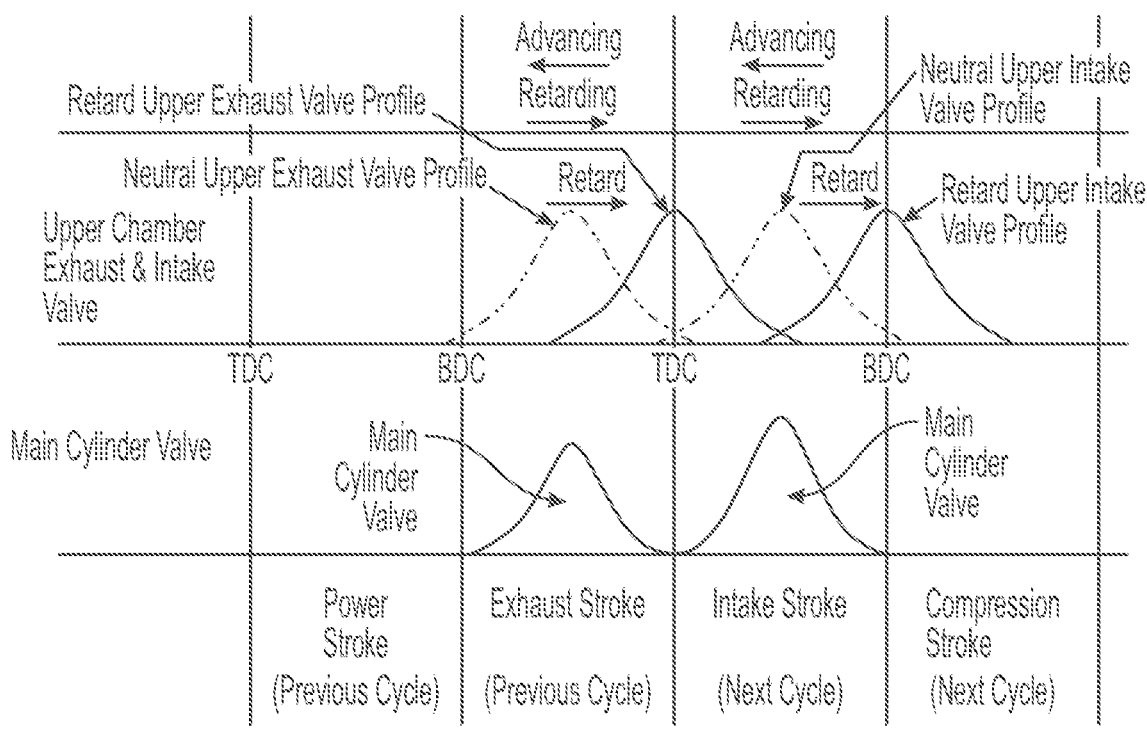

FIG. 19I is a valve profile of the combustion engine 10 operating in an Atkinson cycle mode—with exhaust retarded and intake retarded.

The exhaust stroke requires full duration to expel the exhaust gas 43 from the main combustion cylinder 29 out of engine via the main valve 31, the upper non-combustion chamber 30, and the upper exhaust valve 33. Retarding the timing of the upper exhaust valve 33 delays the flow of exhaust gas 43 out of the upper non-combustion chamber 30 and into the exhaust manifold 19. The late opening of the upper exhaust valve 33 causes the exhaust gas 43 to pressurize in the upper non-combustion chamber 30 until the upper exhaust valve 33 opens. Once open, the exhaust gas 43 will travel at a velocity from the upper non-combustion chamber 30 to the exhaust manifold 19 that is higher than normal via the upper exhaust valve 33. Because of the short duration of the upper exhaust valve 33 opening during the exhaust stroke there will be exhaust gas 43 in the upper non-combustion chamber 30 during the intake stroke. That exhaust gas 43 will be reintroduced into the main combustion cylinder 29 via the main valve 31 during the intake stroke leading to partial displacement capacity. The overlap between the upper exhaust valve 33 and the upper intake valve 32 opening happens mostly in the intake stroke; therefore, exhaust gas 43 is present in the upper non-combustion chamber 30 during the intake stroke.

The retarded timing of the upper intake valve 32 decreases the duration of intake air 44 draws in from the intake manifold 18 into the main combustion cylinder 29 via the upper intake valve 32 and the main valve 31. The overall decrease in gas flow into the main combustion cylinder 29 during the intake stroke leads to a shorter compression ratio to expansion ratio like the Atkinson cycle.

It should be understood, of course, that the foregoing relates to exemplary embodiments of the disclosure and that modifications may be made without departing from the scope of the disclosure as set forth in the following claims.

I claim:
1. A combustion engine, comprising:
   a main combustion cylinder configured to enable a piston to move therein;
   a main valve configured to move in the main combustion cylinder;

an upper non-combustion chamber operatively adjacent to the main combustion cylinder;
an upper intake valve configured to move in the upper non-combustion chamber and to communicate with an intake manifold; and
an upper exhaust valve configured to move in the upper non-combustion chamber and to communicate with an exhaust manifold;
wherein the main valve is further configured to always maintain a fixed timing at the same time that one of a timing of the upper intake valve and a timing of the upper exhaust valve is varied.

2. The combustion engine of claim 1, further comprising: a main camshaft operatively connected to the main valve.

3. The combustion engine of claim 1, further comprising: an upper intake camshaft operatively connected to the upper intake valve.

4. The combustion engine of claim 1, further comprising: an upper exhaust camshaft operatively connected to the upper exhaust valve.

5. The combustion engine of claim 1, further comprising: a plurality of main valves configured to move in the main combustion cylinder;
a plurality of upper intake valves configured to move in the upper non-combustion chamber; and
a plurality of upper exhaust valves configured to move in the upper non-combustion chamber.

6. The combustion engine of claim 1, wherein: the upper non-combustion chamber is in gas communication with the main combustion cylinder.

7. A combustion engine, comprising:
a main combustion cylinder;
a main valve in the main combustion cylinder;
an upper non-combustion chamber in gas communication with the main combustion cylinder;
an upper intake valve in the upper non-combustion chamber; and
an upper exhaust valve in the upper non-combustion chamber;
wherein the main valve, the upper intake valve, and the upper exhaust valve are configured to move independently of one another in a timed manner;
wherein the main valve, the upper intake valve, and the upper exhaust valve are configured to operate in a blow back mode;
wherein, in the blow back mode, the upper intake valve is further configured to transfer exhaust gas to an intake manifold.

8. The combustion engine of claim 7, wherein: the main combustion cylinder is configured to enable combustion of intake air therein.

9. The combustion engine of claim 7, wherein: the main valve is configured to operate, in the main combustion cylinder, as a main intake valve and a main exhaust valve.

10. The combustion engine of claim 7, wherein: the upper non-combustion chamber is configured to:
receive intake air from outside of the combustion engine; and
expel exhaust gas from the main combustion cylinder.

11. The combustion engine of claim 7, wherein: the main valve, the upper intake valve, and the upper exhaust valve are further configured to operate in a full engine displacement mode and a partial engine displacement mode;
wherein, in the full engine displacement mode, the combustion engine is operating at a maximum displacement capacity of the combustion engine;
wherein, in the partial engine displacement mode, the combustion engine is operating at less than the maximum displacement capacity of the combustion engine.

12. The combustion engine of claim 7, wherein: the main valve, the upper intake valve, and the upper exhaust valve are further configured to operate in an Otto cycle mode and an Atkinson cycle mode;
wherein, in the Otto cycle mode, the combustion engine includes a piston compression stroke equal to a piston expansion stroke;
wherein, in the Atkinson cycle mode, the compression engine includes the piston compression stroke less than the piston expansion stroke.

13. A combustion engine, comprising:
a main combustion cylinder;
a main valve in the main combustion cylinder;
an upper non-combustion chamber configured to operate, with the main combustion cylinder, in an intake mode, in a compression mode, and in an exhaust mode;
an upper intake valve in the upper non-combustion chamber; and
an upper exhaust valve in the upper non-combustion chamber;
wherein the main valve is configured to always maintain a fixed timing at the same time that one of a timing of the upper intake valve and a timing of the upper exhaust valve is varied.

14. The combustion engine of claim 13, further comprising:
an intake manifold in gas communication with the upper non-combustion chamber.

15. The combustion engine of claim 13, further comprising:
an exhaust manifold in gas communication with the upper non-combustion chamber.

16. The combustion engine of claim 13, further comprising:
a main camshaft configured to move the main valve in the main combustion cylinder.

17. The combustion engine of claim 13, further comprising:
an upper intake camshaft configured to move the upper intake valve in the upper non-combustion chamber.

18. The combustion engine of claim 13, further comprising:
an upper exhaust camshaft configured to move the upper exhaust valve in the upper non-combustion chamber.

19. The combustion engine of claim 13, wherein: the main valve is configured to enable intake air into the main combustion cylinder and expel exhaust gas out of the main combustion cylinder.

20. A computer implemented method of varying a displacement of a combustion engine, comprising:
controlling, by a controller, a timing of an upper intake valve in an upper non-combustion chamber of an engine block of the combustion engine;
controlling, by the controller, a timing of an upper exhaust valve in the upper non-combustion chamber; and
controlling, by the controller, a timing of a main valve in a main combustion cylinder of the engine block;
wherein the main valve timing, the upper intake valve timing, and the upper exhaust valve timing are controlled independently of one another;

wherein the main valve timing is always fixed at the same time that one of the upper intake valve timing and the upper exhaust valve timing is varied.

21. The method of claim 20, wherein controlling the timing of the upper intake valve includes advancing or retarding the timing of the upper intake valve.

22. The method of claim 20, wherein controlling the timing of the upper exhaust valve includes advancing or retarding the timing of the upper exhaust valve.

23. The method of claim 20, further comprising:
enabling, by the timing of the upper intake valve and the main valve, intake air to enter the upper non-combustion chamber and pass into the main combustion cylinder; and
enabling, by the timing of the upper exhaust valve and the main valve, exhaust gas to pass from the main combustion cylinder into the upper non-combustion chamber and exit from the upper non-combustion chamber.

24. A non-transitory computer readable medium with executable instructions stored thereon, executed by a processor, to perform a method for varying a displacement of a combustion engine, the method comprising:
changing at least one of:
a timing of an upper intake valve in an upper non-combustion chamber of an engine block of the combustion engine; and
a timing of an upper exhaust valve in the upper non-combustion chamber; and
fixing a timing of a main valve in a main combustion cylinder of the engine block;
wherein the main combustion cylinder is in gas communication with the upper non-combustion chamber;
wherein changing at least one of the timing of the upper intake valve and the timing of the upper exhaust valve occur independently of one another;
wherein varying the displacement of the combustion engine includes operating the combustion engine in a blow back mode;
wherein, in the blow back mode, the upper intake valve is further configured to transfer exhaust gas to an intake manifold.

25. The method of claim 24, wherein varying the displacement of the combustion engine includes operating the combustion engine in a full engine displacement mode and a partial engine displacement mode;
wherein, in the full engine displacement mode, the combustion engine is operating at a maximum displacement capacity of the combustion engine; and
wherein, in the partial engine displacement mode, the combustion engine is operating at less than the maximum displacement capacity of the combustion engine.

26. The method of claim 24, wherein varying the displacement of the combustion engine includes operating the combustion engine in an Otto cycle mode and an Atkinson cycle mode;
wherein, in the Otto cycle mode, the combustion engine includes a piston compression stroke equal to a piston expansion stroke; and
wherein, in the Atkinson cycle mode, the compression engine includes the piston compression stroke less than the piston expansion stroke.

27. The method of claim 24, further comprising:
changing at least one of:
a timing of a plurality of upper intake valves in the upper non-combustion chamber; and
a timing of a plurality of upper exhaust valves in the upper non-combustion chamber.

28. A non-transitory computer readable medium with executable instructions stored thereon, executed by a processor, to perform a method for operating a combustion engine in a full displacement mode, the method comprising:
fixing an upper intake valve in a neutral timing, wherein the upper intake valve is in an upper non-combustion chamber of an engine block of the combustion engine in a neutral timing; and
fixing an upper exhaust valve in the neutral timing, wherein the upper exhaust valve is in the upper non-combustion chamber; and
fixing a timing of a main valve in a main combustion cylinder of the engine block;
wherein the neutral timing of the upper intake valve and of the upper exhaust valve overlap with the timing of the main valve;
fixing a valve duration of the upper intake valve that is greater than a valve duration of the main valve;
fixing a valve duration of the upper exhaust valve at greater than the valve duration of the main valve;
wherein, in an exhaust stroke of a previous cycle of the combustion engine, and after a piston of the combustion engine reaches a bottom dead center (BDC) position, the main valve opens, the upper exhaust valve opens, the piston pushes exhaust gas into the upper non-combustion chamber, and then into an exhaust manifold of the combustion engine;
wherein, in a late stage of the exhaust stroke of the previous cycle, the upper intake valve opens, intake air pushes the exhaust gas out of the upper non-combustion chamber and to the upper exhaust valve, and then into an exhaust manifold of the combustion engine;
wherein, in an intake stroke of a next cycle of the combustion engine, the upper exhaust valve closes, the main valve opens, and the piston draws the intake air into the main combustion cylinder;
wherein, in a compression stroke of the next cycle, the intake air is compressed in the main combustion cylinder and is ready for combustion burning; and
wherein, in a power stroke of the next cycle, the upper intake valve closes, the upper exhaust valve closes, the main valve closes, and combustion pushes the piston to turn a crankshaft of the combustion engine.

29. A non-transitory computer readable medium with executable instructions stored thereon, executed by a processor, to perform a method for operating a combustion engine in a partial displacement mode, the method comprising:
fixing an upper intake valve in a neutral timing, wherein the upper intake valve is in an upper non-combustion chamber of an engine block of the combustion engine;
fixing an upper exhaust valve in an advanced timing, wherein the upper exhaust valve is in the upper non-combustion chamber;
fixing a timing of a main valve in a main combustion cylinder of the engine block;
wherein the neutral timing of the upper intake valve overlaps with the timing of the main valve;
wherein the advanced timing of the upper exhaust valve causes the upper exhaust valve to open and close in advance of the main valve opening and closing;
wherein the advanced timing of the upper exhaust valve decreases timing overlap with the main valve during an exhaust stroke;
wherein, in an exhaust stroke of a previous cycle of the combustion engine, the upper exhaust valve opens before a piston reaches a bottom dead center (BDC)

position; and after the piston reaches the BDC position, the main valve opens and the piston pushes exhaust gas out of the main combustion cylinder, into the upper non-combustion chamber, and then out into an exhaust manifold of the combustion engine;

wherein, in a late stage of the exhaust stroke of the previous cycle, the upper exhaust valve and the upper intake valve close, the main valve is open, and the piston pushes exhaust gas into the upper non-combustion chamber;

wherein, in an intake stroke of a next cycle of the combustion engine, the upper intake valve opens before the piston reaches a top dead center (TDC) position and before beginning of the intake stroke, the upper exhaust valve is closed and the main valve opens at the beginning of the intake stroke, and the piston draws exhaust gas and then intake air from the upper non-combustion chamber and into the main combustion cylinder;

wherein, in a compression stroke of the next cycle, the upper intake valve, the upper exhaust valve and the main valve are closed; the intake air is compressed with the exhaust gas in the main combustion cylinder and is ready for combustion burning;

wherein, in a power stroke of the next cycle, the upper intake valve, the upper exhaust valve and the main valve are closed; and combustion pushes the piston to turn a crankshaft of the combustion engine.

30. A non-transitory computer readable medium with executable instructions stored thereon, executed by a processor, to perform a method for operating a combustion engine in a blow back mode, the method comprising:

fixing an upper intake valve in a neutral timing, wherein the upper intake valve is in an upper non-combustion chamber of an engine block of the combustion engine; and fixing an upper exhaust valve in an advanced timing, wherein the upper exhaust valve is in the upper non-combustion chamber;

fixing a timing of a main valve in a main combustion cylinder of the engine block;

wherein the upper exhaust valve opens before a bottom dead center (BDC) position of a piston of the combustion engine wherein the neutral timing of the upper intake valve overlaps with the timing of the main valve;

wherein a valve duration of the upper intake valve is greater than a valve duration of the main valve;

wherein, in an exhaust stroke of a previous cycle of the combustion engine, the piston pushes exhaust gas into the upper non-combustion chamber and out to an exhaust manifold;

wherein, in a late stage of the exhaust stroke of the previous cycle, the upper exhaust valve closes, the upper intake valve opens, and exhaust gas flows from the main combustion cylinder and into the upper non-combustion chamber and then to an intake manifold of the combustion engine, whereby the intake manifold acts as a reservoir for the exhaust gas and intake air for a next cycle;

wherein, in an intake stroke of the next cycle, the piston draws the exhaust gas and the intake air from the intake manifold, through the upper non-combustion chamber and into the main combustion cylinder;

wherein, in a compression stroke of the next cycle, the upper exhaust valve, the upper intake valve, and the main valve are closed; the intake air is compressed with the exhaust gas in the main combustion cylinder and are ready for combustion burning;

wherein, in a power stroke of the next cycle, the upper exhaust valve, the upper intake valve, and the main valve are closed; and combustion pushes the piston to turn a crankshaft of the combustion engine.

31. A non-transitory computer readable medium with executable instructions stored thereon, executed by a processor, to perform a method for operating a combustion engine in an Atkinson cycle mode, the method comprising:

fixing an upper intake valve in an advanced timing, wherein the upper intake valve is in an upper non-combustion chamber of an engine block of the combustion engine;

fixing an upper exhaust valve in a neutral timing, wherein the upper exhaust valve is in the upper non-combustion chamber;

fixing a main valve in a neutral timing, wherein the main valve is in a main combustion cylinder of the engine block;

wherein the neutral timing of the upper exhaust valve allows exhaust gas to fully flow out the main combustion cylinder and into the upper non-combustion chamber via the main valve;

wherein the advanced timing of the upper intake valve allows the upper intake valve to open during an exhaust cycle of the combustion engine;

wherein overlap of openings of the upper exhaust valve and the upper intake valve at the same time enables exhaust gas to pull intake air into an exhaust manifold of the combustion engine via the upper intake valve, the upper non-combustion chamber, and the upper exhaust valve; whereby the intake air replaces exhaust gas in the upper non-combustion chamber; whereby exhaust gas exits the combustion engine via the upper exhaust valve;

wherein, in an early closing of upper intake valve during an intake stroke of the combustion engine, decreased gas volume enters the main combustion cylinder and there is a smaller compression stroke than an expansion stroke of the combustion engine.

* * * * *